United States Patent
Kompella

(10) Patent No.: US 9,813,326 B2
(45) Date of Patent: *Nov. 7, 2017

(54) DECOUPLING FUNCTIONALITY RELATED TO PROVIDING A TRANSPARENT LOCAL AREA NETWORK SEGMENT SERVICE

(71) Applicant: Juniper Networks, Inc., Sunnyvale, CA (US)

(72) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,262

(22) Filed: Jan. 5, 2015

(65) Prior Publication Data

US 2015/0109963 A1 Apr. 23, 2015

Related U.S. Application Data

(63) Continuation of application No. 14/187,481, filed on Feb. 24, 2014, now Pat. No. 8,958,425, which is a continuation of application No. 12/541,052, filed on Aug. 13, 2009, now Pat. No. 8,693,475, which is a continuation of application No. 10/254,021, filed on Sep. 24, 2002, now Pat. No. 7,577,143.

(60) Provisional application No. 60/325,098, filed on Sep. 25, 2001.

(51) Int. Cl.
*H04L 12/751* (2013.01)
*H04L 12/46* (2006.01)
*H04L 12/721* (2013.01)
*H04L 12/741* (2013.01)

(52) U.S. Cl.
CPC .......... *H04L 45/02* (2013.01); *H04L 12/4633* (2013.01); *H04L 45/08* (2013.01); *H04L 45/66* (2013.01); *H04L 45/74* (2013.01)

(58) Field of Classification Search
None
See application file for complete search history.

(56) References Cited

U.S. PATENT DOCUMENTS

2004/0202171 A1* 10/2004 Hama ................. H04L 12/4641
370/395.1

* cited by examiner

*Primary Examiner* — Rhonda Murphy
(74) *Attorney, Agent, or Firm* — John C. Pokotylo; Pokotylo Patent Services

(57) ABSTRACT

A transport LAN segment service is provided over a transport network. Responsibilities for configuring, provisioning and forwarding over a transport LAN segment are divided between layer 2 and 3 service provider edge devices, where the layer 3 edge device handles discovery and tunneling responsibilities, the layer 2 edge device handles learning and flooding responsibilities, and information can be exchanged between the layer 2 and 3 edge devices. Configuration is simplified by advertising TLS-label information, layer 2 address learning, and flooding when the needed configuration information has not yet been learned or discovered.

22 Claims, 15 Drawing Sheets

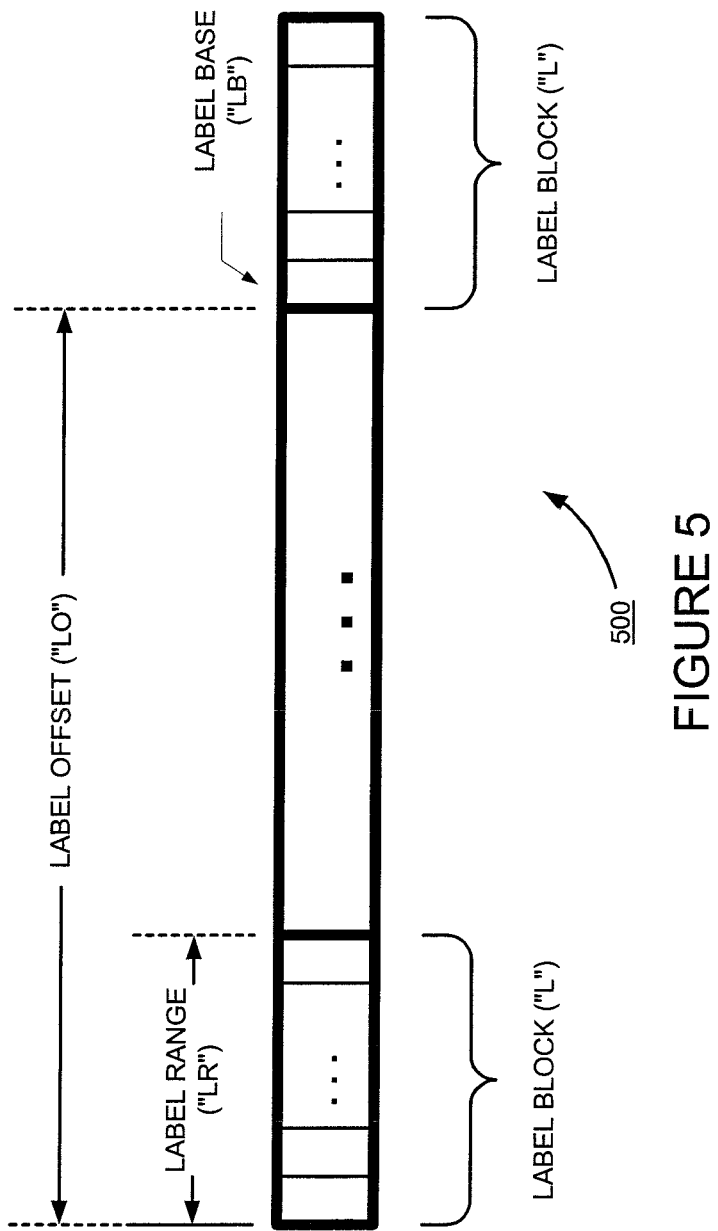

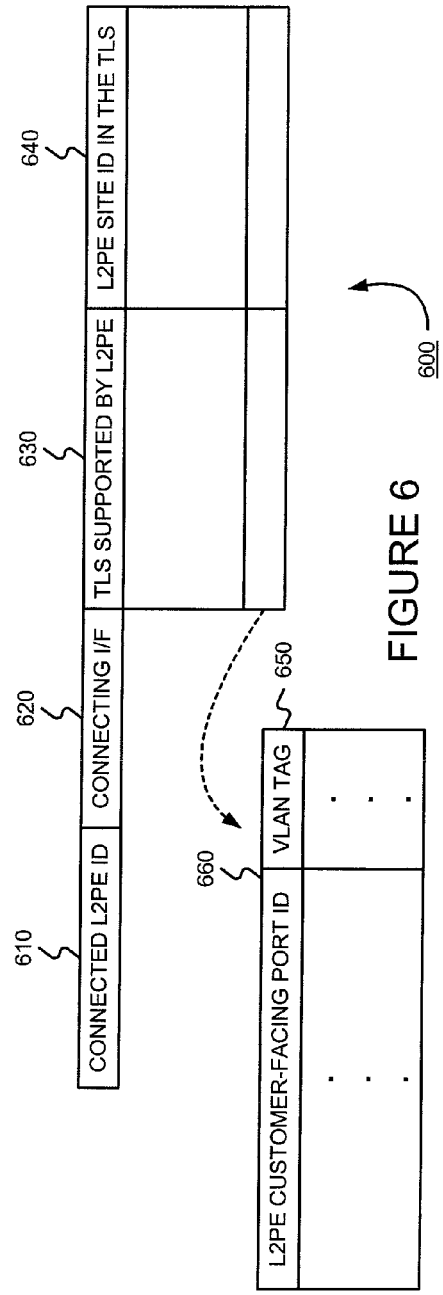
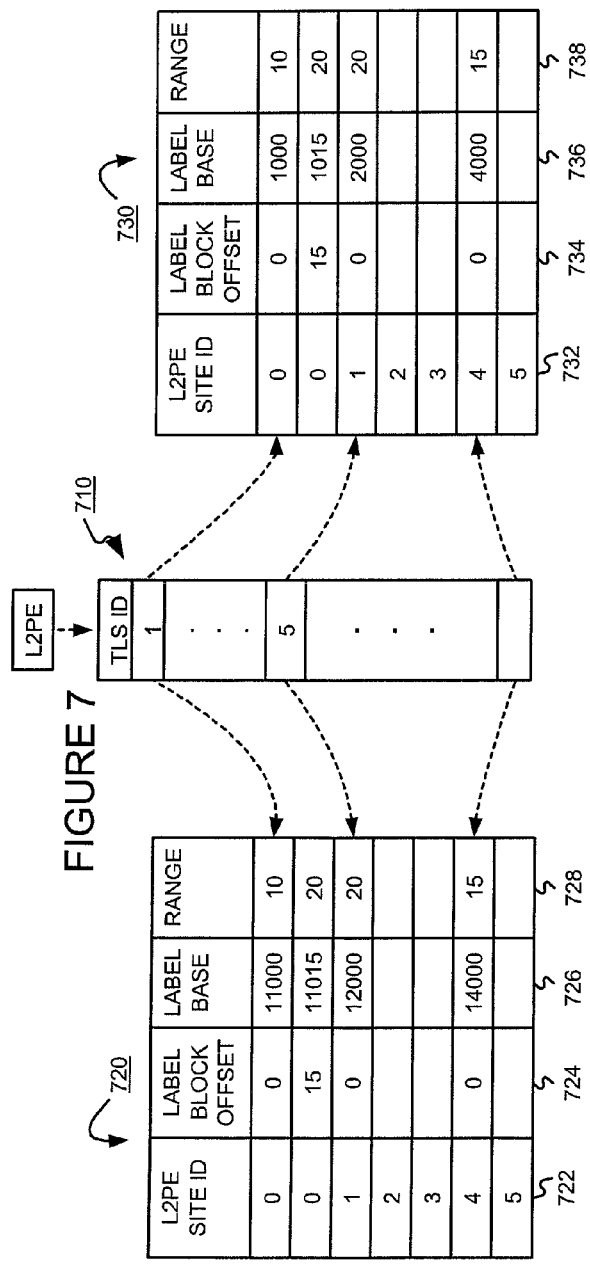

| WAN (EGRESS) ROUTES | | |
|---|---|---|
| TLS LABEL IN | L2PEDIFF LABEL OUT | (LINK TO) L2PE I/F |
| | | |
| | | |
| | | |

| L2PE (INGRESS) ROUTES | | |
|---|---|---|
| L2PEDIFF LABEL IN | TLS LABEL OUT | TUNNEL |
| | | |
| | | |
| | | |

| L2 (MAC) ADDRESS | CUSTOMER-FACING PORT | L2PEDIFF LABEL |
|---|---|---|
| | | |
| | | |
| | | |
| | | |

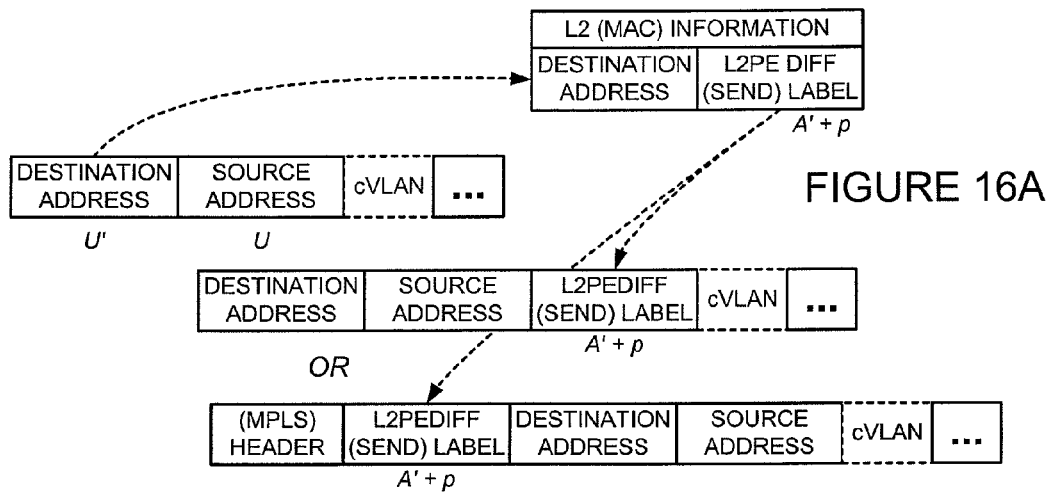
FIGURE 16A
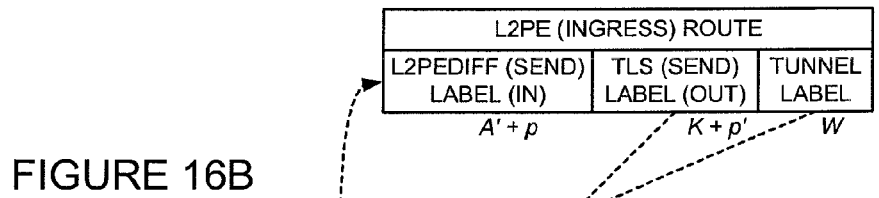
FIGURE 16B
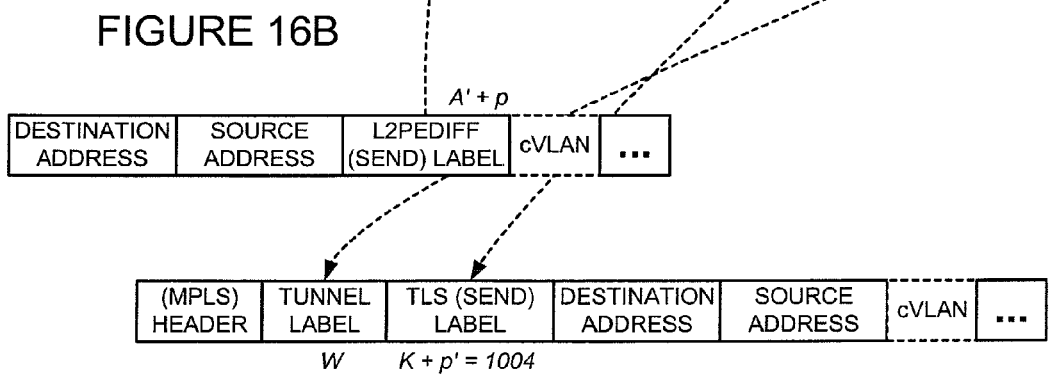

DECOUPLING FUNCTIONALITY RELATED TO PROVIDING A TRANSPARENT LOCAL AREA NETWORK SEGMENT SERVICE

§0. RELATED APPLICATIONS

The present application is a continuation of U.S. patent application Ser. No. 14/187,481, filed on Feb. 24, 2014, titled "DECOUPLING FUNCTIONALITY RELATED TO PROVIDING A TRANSPARENT LOCAL AREA NETWORK SEGMENT SERVICE," and listing Kireeti Kompella as the inventor (referred to as "the '481 application" and incorporated herein by reference), the '481 application being a continuation of U.S. patent application Ser. No. 12/541,052, filed on Aug. 13, 2009, titled "DECOUPLING FUNCTIONALITY RELATED TO PROVIDING A TRANSPARENT LOCAL AREA NETWORK SEGMENT SERVICE," issued as U.S. Pat. No. 8,693,475 on Apr. 8, 2014, and listing Kireeti Kompella as the inventor (referred to as "the '052 application" and incorporated herein by reference), the '052 application being a continuation of U.S. patent application Ser. No. 10/254,021, filed on Sep. 24, 2002, titled "DECOUPLING FUNCTIONALITY RELATED TO PROVIDING A TRANSPARENT LOCAL AREA NETWORK SEGMENT SERVICE," issued as U.S. Pat. No. 7,577,143 on Aug. 18, 2009, and listing Kireeti Kompella as the inventor (referred to as "the '021 application" and incorporated herein by reference), the '021 application claiming the benefit of U.S. Provisional Patent Application Ser. No. 60/325,098, filed on Sep. 25, 2001, titled "DECOUPLED TRANSPARENT LAN SERVICES," and listing Kireeti Kompella as the inventor (incorporated herein by reference).

§1. BACKGROUND OF THE INVENTION

§1.1 FIELD OF THE INVENTION

The present invention concerns methods, apparatus and data structures for providing a transport network that supports a virtual LAN service. More specifically, the present invention concerns emulating a transparent LAN segment to support a virtual LAN. The present invention also concerns configuring such a network.

§1.2 RELATED ART

The description of art in this section is not, and should not be interpreted to be, an admission that such art is prior art to the present invention.

§1.2.1 KNOWN PRIVATE NETWORKING TECHNOLOGIES

For many entities (such as businesses, universities, etc.), local area networks (LANs) suffice for intra-entity communications. Indeed, LANs are quite popular since they are relatively inexpensive to deploy, operate, and manage, and are based on mature, well-developed technology, such as Ethernet, for example. Unfortunately, however, most entities need to communicate (voice and/or data) with their own facilities, or others, beyond their immediate location. Thus, wide area networks (WANs) are needed. Very often, entities want at least some privacy or security attached to their communications.

Presently, private long-haul communications can take place over networks that can be generally classified into two types—dedicated WANs that facilitate communications among multiple sites, and public transport networks that allow one or more sites of a private network to communicate. Both of these types of networks are introduced below.

Dedicated WANs are typically implemented using leased lines or dedicated circuits to connect multiple sites. Customer premise equipment (CPE) routers or switches at these sites connect these leased lines or dedicated circuits together to facilitate connectivity between each site of the network. Unfortunately, dedicated WANs are relatively expensive and typically require the customer to have some networking expertise.

Public transport networks, which are typically deployed by regional bell operating companies (RBOCs), or some other service provider, are often used to allow remote users to connect to an enterprise network using the public-switched telephone network (PSTN), an integrated services digital network (ISDN), or some other type of transport network technology. (Note that the word "public" in the phrase "public transport network" denotes the fact that more than one entity may use it, even though it may be privately owned and managed, and not available to the general public.) Such remote access may be facilitated by deploying network access servers (NASs) at one or more central cites. When users connect to (e.g., dial into) a NAS, it works with authentication, authorization and accounting (AAA) servers to verify the identity of the user and to check which services that user is authorized to use.

Transparent LAN services (TLS) would be an attractive service to many customers of Service Providers. One instance where such an offering could be provided is in a metropolitan area, where one or more multi-tenant buildings are connected to a central office, and several central offices are connected with one other via a transport network. Often, a Service Provider will deploy a simple, low-cost device (dubbed a multi-tenant unit (MTU)) in each building. Each of the MTUs has at least one link with a service provider edge unit (L3PE) in one or more offices. Thus, although customers are not connected to a single LAN, since they may be spread across a metro area or a wide area, the transparent LAN service will appear to such customers as a single LAN.

As can be appreciated, private dedicated WANs are beyond the financial reach of many entities. Accordingly, so-called public transport networks have become quite popular. However, providing transparent LAN segment services via MTUs, which typically have on the order of 10 to 100 Ethernet ports and one or more uplinks to an edge device (L3PE), poses challenges with regard to scalability, as well as performing configuration, discovery and learning functions in a simple, cost-effective way.

Thus, an alternative public transport network is needed. Such a public transport network should (i) support the provision of virtual private network functions, (ii) be easy for a service provider to deploy (provision and configure) and manage, (iii) allow customers to use a mature technology that is easy to install, use and manage, such as Ethernet for example, while shielding them from the complexities of the transport network, (iv) be scalable, and/or (v) provide the needed functionality in a cost effective manner.

§2 SUMMARY OF THE INVENTION

A transport LAN segment service is provided over a transport network. Responsibilities for configuring, provisioning and forwarding over a TLS are divided between a layer 2 and 3 devices, where the layer 3 device handles discovery and tunneling responsibilities, the layer 2 device handles learning and flooding responsibilities, and information can be exchanged between the layer 2 and 3 devices. Configuration is simplified by advertising TLS-label information, layer 2 address learning, and flooding when the needed configuration information has not yet been learned or discovered.

§3. BRIEF DESCRIPTION OF THE DRAWINGS

FIG. 5 is a block diagram illustrating the concept of a set of label-blocks associated with an L2PE and a TLS.

FIG. 6 is a block diagram illustrating exemplary information that may be configured at an L3PE and/or an L2PE.

FIG. 7 is a block diagram illustrating exemplary L2PE label information and WAN label information that may be generated by, and/or stored at, an L3PE.

FIG. 8 is a block diagram illustrating exemplary L2PE routes that may be generated by, and/or provided at, an L3PE.

FIG. 9 is a block diagram illustrating exemplary WAN routes that may be generated by, and/or provided at, an L3PE.

FIG. 10 is a block diagram illustrating exemplary L2 (e.g., MAC address) forwarding information that may be learned and/or provided at an L2PE.

FIGS. 16A-16D provide an example that illustrates how a packet is forwarded over a wide area TLS in accordance with one embodiment of the present invention.

Figure 17:
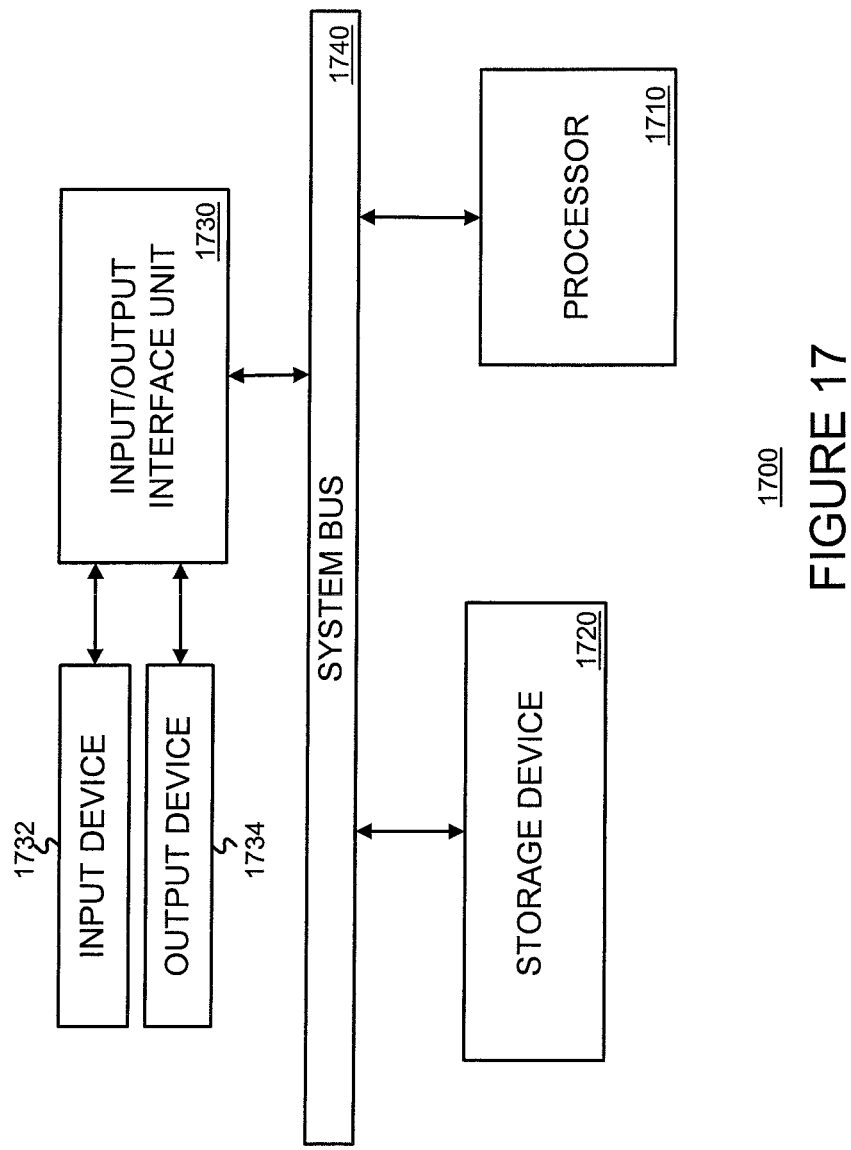

FIG. 17 is a block diagram of apparatus that may be used to implement the present invention.

§4. DETAILED DESCRIPTION

The present invention involves novel methods, apparatus and data structures for providing edge devices in a transport network such that the transport network can act as a transparent LAN segment, as well as methods, apparatus and data structures for provisioning and configuring such edge devices. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown and the inventor regards his invention as the following disclosed methods, apparatus and data structures and any other patentable subject matter.

In the following, an exemplary environment in which the invention may operate is described in §4.1. Then, high-level applications that may be performed by the present invention are introduced in §4.2. Thereafter, exemplary L2PEs and L3PEs that may be used to effect various aspects of the present invention are introduced in §4.3. Then, exemplary methods and data structures that may be effected by and stored by, respectively, L2PEs and L3PEs, as well as examples illustrating how such methods operate, are described in §4.4. Finally, some conclusions regarding various aspects of the present invention are provided in §4.5.

In the following description, the term "TLS" is used broadly. TLS can be used to refer to a "Transparent LAN Service", which is a service emulating a LAN and including a number of LAN or virtual LAN segments at customer sites, and an emulated LAN or virtual LAN segment bridging the LAN segments into one LAN. TLS can also be used to refer to the emulated (transparent) LAN or virtual LAN segment provided by the service provider network to bridge the customer LAN or virtual LAN segments into one LAN. Note further that a TLS can support more than one virtual LAN. The intended meaning of "TLS" or "VLAN" should be apparent from the contexts in which each are used. The term "tunnel label" is also used broadly to include tunnels that don't use labels. The term "packet" is used in the specification without loss of generality and includes any type of addressed data. In some instances, a service provider must be bale to emulate multiple TLS segments, one or more per customer, and must also keep each TLS private (i.e., traffic for a given TLS must not leak into another). The present invention permits multiple TLSs to be created and provides mechanisms to keep the traffic separate.

§4.1 EXEMPLARY ENVIROMENT IN WHICH THE PRESENT INVENTION MAY OPERATE

Figure 1:
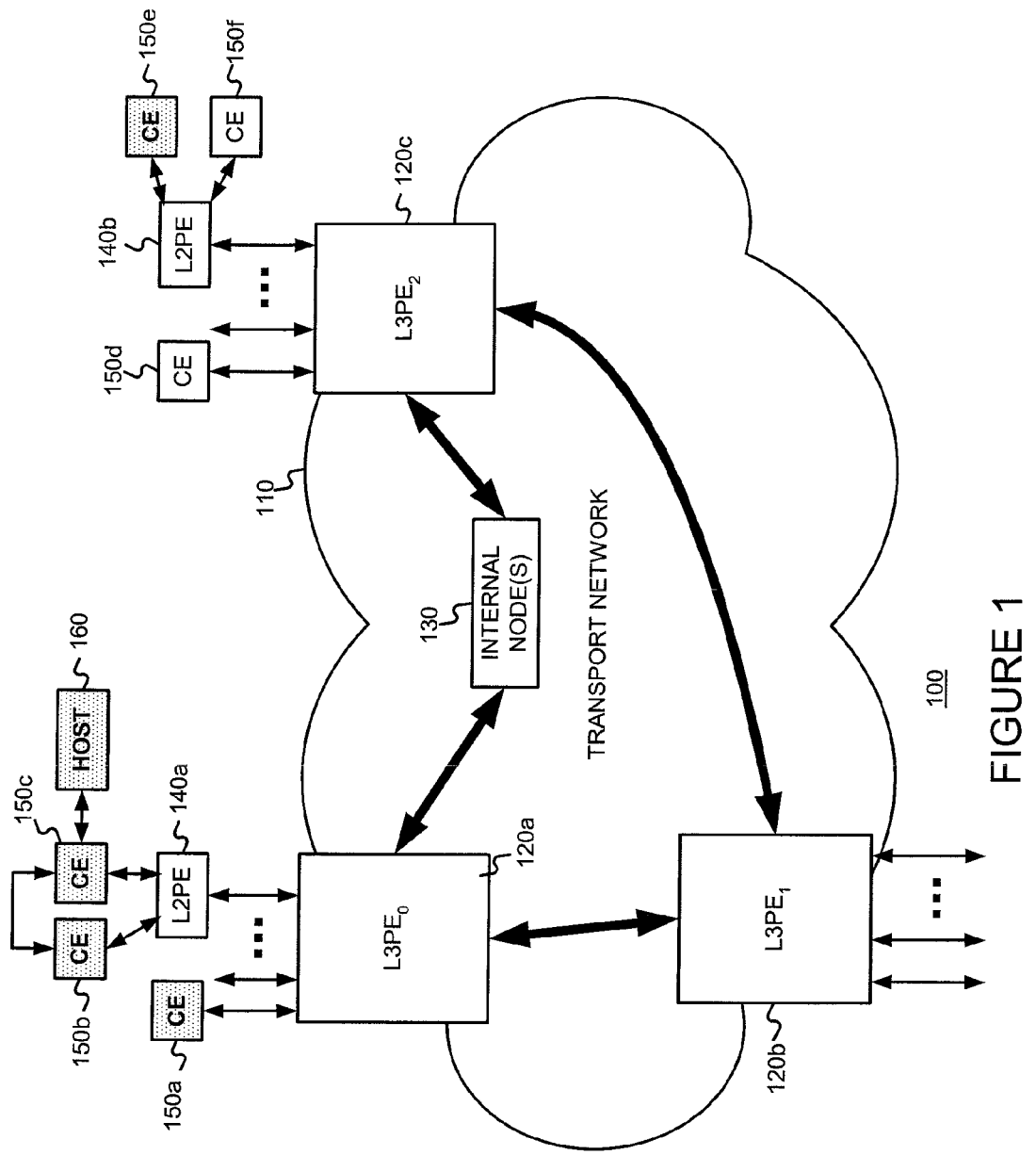
FIG. 1 illustrates an environment in which the present invention may be used.

FIG. 1 illustrates an exemplary environment 100 in which the present invention may operate. A service provider may operate a transport network 110 to provide a transparent LAN segment service for use by a customer having multiple LANs at multiple sites. Each of the LANs may have a one or more host devices 160, and may be coupled with the transport network 110 via a customer edge (CE) device 150, via an L2PE 140, or via both a CE and L2PE. The CE 150 or L2PE 140 may, in turn, be coupled with an L3PE 120, such as a router for example. Internal nodes 130, such as routers, may be used to permit communications between various L3PEs 120 of the transport network 110. In environment 100, a LAN may include the CE and host devices depicted with stippling, as well as devices coupled with the CEs, and transparent LAN segments. As can be appreciated from the foregoing description of FIG. 1, the transparent LAN segments can be thought of as coupling or bridging geographically remote LANs.

In one exemplary embodiment, the transport network 110 may be a label-switching network, such as a multi-protocol label switching (MPLS) network, although the present invention can work with other communications networks affording communications between the L3PEs 120. In one embodiment, tunnels couple each of the L3PEs to form a "full mesh" topology.

Figure 2:
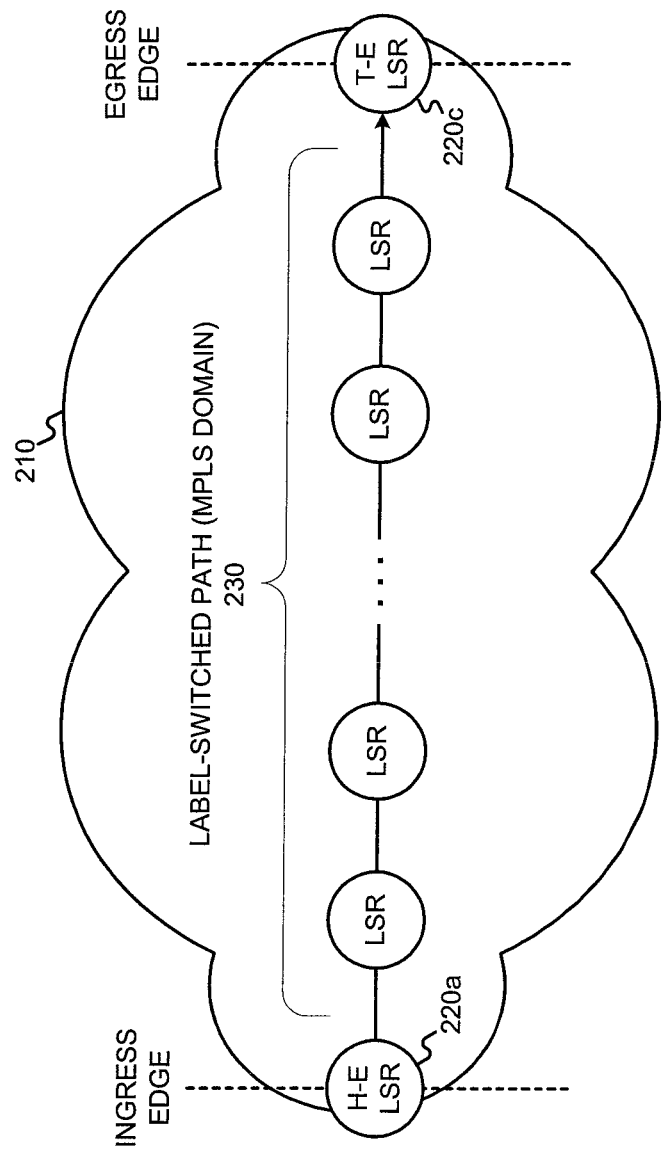
FIG. 2 illustrates a label-switched path.

Although label-switched paths (LSPs) and MPLS are known to those skilled in the art, each is introduced below for the convenience of the less experienced reader. FIG. 2 illustrates an LSP 230 across a network 210. Notice that LSPs 230 may be simplex—traffic flows in one direction from a head-end LSR 220*a* at an ingress edge to a tail-end LSR 220*c* at an egress edge. Duplex traffic typically requires two LSPs—one for each direction, but may use a bi-directional LSP. Notice that an LSP 230 is defined by the concatenation of one or more label-switched hops, allowing a packet to be forwarded from one LSR to another across the MPLS domain 230.

As is known, a label may be a short, fixed-length value carried in the packet's header to identify a forwarding equivalence class (FEC). An FEC is a set of packets that are forwarded over the same path through a network even if their ultimate destinations are different. Alternatively, labels needn't be explicitly defined in a packet's header. That is, labels may be inferred. For example, in Generalized MPLS (GMPLS), a label could be a time slot (e.g., in SONET/SDH cross-connects), or even a port number (e.g., in Optical Cross-Connects).

Figure 3:
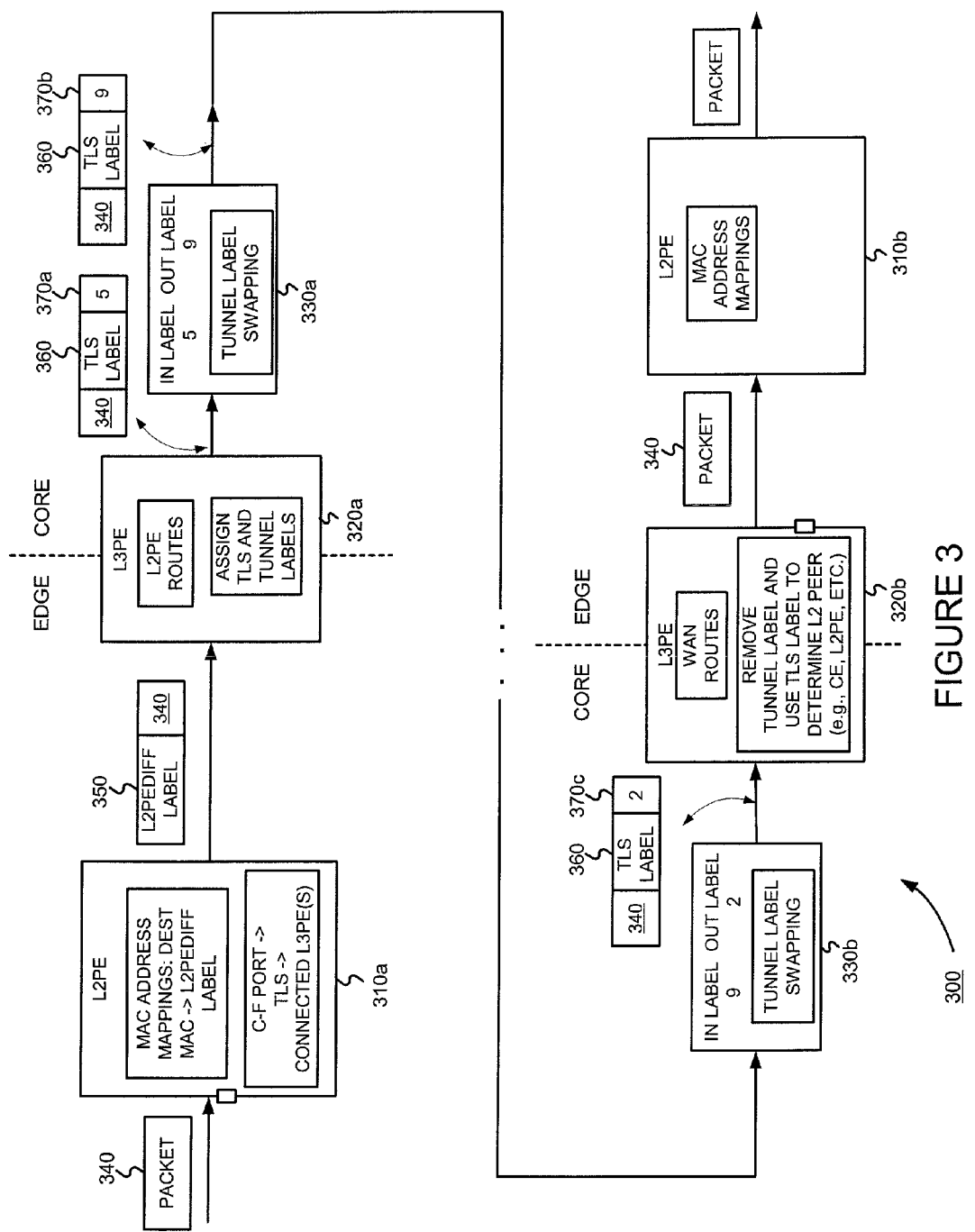
FIG. 3 illustrates operations of one embodiment of the present invention, together with a label-switched path.

FIG. 3 illustrates the operation of one embodiment of the present invention that uses an LSP. In this exemplary embodiment, the present invention uses labels as "tunnel labels" to transport data from an ingress L3PE to an egress L3PE. In such a case, an L2PE 310*a* may operate in accordance with, for example, the method 1400 of FIG. 14 to assign a layer 2 device (and TLS) differentiator ("L2PEDIFF") label (e.g., a VLAN tag, a data link circuit identifier (DLCI), an asynchronous transfer mode (ATM) virtual channel (VC), an MPLS label (layer 2.5), etc.) to the packet, and at the ingress edge of the transport network, the L3PE (e.g., a router) 320*a* may operate in accordance with, for example, the method 1500 described with reference to FIG. 15 to replace the L2PEDIFF label with an initial tunnel label 370*a*, as well as a TLS label 360.

More specifically, referring to the example illustrated in FIG. 3, an L2PE 310*a* receiving a packet 340 at a customer-facing port can use the destination layer 2 (e.g., media access control (MAC)) address to determine an L2PEDIFF label 350 (which has been learned—otherwise, the L2PE can use flooding). Note that if the destination layer 2 address is for a local device (that is, a device which can be reached without going through any layer 3 devices of the transport network), the L2PE can simply look up a customer-port on which to place the packet. This example, however, assumes that the destination layer 2 address is for a remote device. The L2PEDIFF label 350 is added (e.g., prepended) to the packet 340. The L2PE can also determine an L3PE (link) to which the packet should be sent (e.g., based on the customer-facing port, the TLS can be determined, and each TLS has an associated L3PE (and link thereto)). Using the L2PEDIFF label 350, an ingress LSR L3PE 320*a* determines a TLS label 360 (which will have been discovered), as well as a tunnel label 370*a* (which will have been determined, e.g., using known protocols). The tunnel label will be used to get the packet 340 to the appropriate egress LSR L3PE 320*b*.

In the MPLS domain, LSRs 330 simply forward the packet using label-switching. More specifically, when a labeled packet arrives at an LSR, the input port number and the tunnel label are used as lookup keys into an MPLS forwarding table. When a match is found, the forwarding component retrieves the associated outgoing label, the outgoing interface (or port), and the next hop address from the forwarding table. The incoming tunnel label is replaced with the outgoing tunnel label and the packet is directed to the outgoing interface for transmission to the next hop in the label switched path. FIG. 3 illustrates such label switching by LSRs 330*a* and 330*b*. Notice that the TLS label 360 remains unchanged.

When the labeled packet arrives at the egress L3PE 320*b*, the L3PE may use the TLS label 360 to determine the peer device (e.g., CE, L2PE, etc.) to which the packet 340 should be forwarded. Since the tunnel and TLS labels are no longer needed, they may be removed at this point. In this example, the peer is L2PE 310*b*. Here, the L2PE 310*b* uses the destination layer 2 address of the packet 340 to lookup the appropriate customer-facing port on which to place the packet (which will have been learned—otherwise, the L2PE 310*b* may flood the packet onto each of its customer-facing ports). The packet is then forwarded to a device of the customer's LAN which, presumably, should be able to advance the packet to the destination device.

The foregoing description of the packet forwarding using label switching presumed the existence of LSPs and associated tunnel label entries in forwarding tables. These paths are determined and provided to each of the L3PEs in the LSP. Such path determination and distribution may be performed using known label discovery protocols, such as label distribution protocol (LDP), resource reservation protocol (RSVP), and border gateway protocol (BGP). Furthermore, as mentioned earlier, LSPs are just one embodiment of L3PE-to-L3PE tunnels. Other types of tunnels, such as generic route encapsulation (GRE), IP security (IPSec), or the layer 2 tunneling protocol (L2TP) can be used, as can ATM or Frame Relay virtual circuits.

§4.2 HIGH-LEVEL APPLICATIONS THAT MAY BE PERFORMED BY THE INVENTION

As described below, a high-level application of the present invention may be to provide data transport that can act as one or more transparent LAN segments. This application is further described in §4.2.1 below. Another high-level application of the present invention may be to facilitate the configuration (e.g., manual provision of configuration information) of the transport network, including the L2 and L3 service provider edge devices. This application is further described in §4.2.2 below. Yet another high-level application of the present invention may be to facilitate the provisioning (e.g., using discovery, flooding and learning techniques) one or more such a transparent LAN segments. This application is further described in §4.2.3 below.

§4.2.1. DATA (PACKET) TRANSPORT

As data, such as a packet, for example, destined for a particular device (as defined by a layer 2 destination address) is forwarded from a source device on a first LAN to a destination device on a second LAN, where both the first and second LANs are coupled via a transparent LAN segment, it may traverse a path having five basic parts; namely, (i) from the first LAN to an associated L2PE, (ii) from the L2PE to an ingress L3PE used by a determined TLS, (iii) from that ingress L3PE to an egress L3PE associated with the second LAN having the destination device, (iv) from that egress L3PE to another L2PE associated with the second LAN, and (v) from the second L2PE to a customer-facing port associated with the second LAN.

Exemplary methods and data structures for effecting the first and fifth parts of the path are described in more detail in §4.4.3 below, with reference to FIGS. 5-8, 10, 14, 16A and 16D. Exemplary methods and data structures for effecting the second and fourth parts of the path are described in more detail in §4.4.3 below, with reference to FIGS. 5-7, 9, 15, 16B and 16C. Finally, the third part of the path—from the ingress layer 3 service provider edge device to the egress layer 3 service provider edge device—may exploit known label switched path forwarding techniques, as described below in terms of inter-L3PE connectivity.

§4.2.2 CONFIGURATION

To avoid the need to make global changes (i.e., to all L2PEs and L3PEs) to configuration information each time a port to be associated with a TLS is added to the TLS, the present invention may permit the service provider to configure ports locally (i.e., at the given L2PE having the added port, or at its associated L3PE). Once local information to the relevant local L2PE and/or L3PE is provided, and label information that needs to be unique only at the L3PE (not globally) is determined, signaling or discovery protocols may be used to disseminate certain information and flooding and learning techniques may be used to acquire other information. The L2PEs may be IP-addressable and support the simple network messaging protocol (SNMP) functions to allow provisioning (and monitoring) to be done by SNMP.

Exemplary methods and data structures for effecting such configuration are described in §4.4.1 below with reference to FIGS. 5-9 and 11.

§4.2.3 PROVISING TRANSOARENT LAN SEGMENTS

As alluded to in §4.2.2 above, label information may be generated at each L3PE, and signaling or discovery protocols may be used to disseminate label information, among other things (e.g., L3PE identifiers, L2PE identifiers, TLS identifiers), to other L3PEs, and other information to attached L2PEs. The label information may include a set of labels which may be defined by a label offset (if any), a label base, and a label range. L3PEs receiving such signaling may then update WAN and L2PE forwarding information (e.g., routing tables) related to the TLS. L2PEs receiving such signaling may update L2PEDIFF label information. Although an advertisement with label information could be broadcast to all L3PEs of a transport network, and each of the L3PEs could save the advertisement, even if it isn't relevant to the L3PE, for potential future use, having an L3PE save irrelevant advertisements imposes extra overhead on L3PEs. Therefore, an alternative is to discard irrelevant advertisements, and have an L3PE use BGP Route Refresh Capability when a new TLS or port is added so that the information related to the new TLS can get to relevant L3PEs. The L2PEs can also learn L2 addresses based on received packets. If an L2PE doesn't have appropriate L2 address information, it can use flooding on an interim basis until such information is provided or learned. Alternatively, L2PEs can be configured with information about the TLSs they participate in, in which case the L2PEs can signal this information and L2PEDIFF labels to their associated L3PEs.

Exemplary methods and data structures for effecting various aspects of configuration are described in more detail in §4.4.2 below, with reference to FIGS. 7-10, 12 and 13.

§4.3 EXEMPLARY APPARATUS

Generally, TLS functions are divided across the service provider L2 and L3 edge devices. The L2PE preferably performs L2 address learning (including flooding) and runs link or path selection and pruning (e.g., spanning tree) algorithms. Apparatus, such as MTUs already have similar capabilities. Further, if L2 address learning and were to be run at the L3PE, scalability would likely become more challenging. The L3PE preferably performs signaling functions related to the TLS services using discovery protocols (e.g., BGP) since it may already have similar L3 capabilities and because the number of L3PE-L3PE peers should typically be much less than the number of L2PE-L2PE peers. The L3PE also preferably supports all configuration so that such configuration can be done once at an L3PE, rather than at many individual L2PEs, although a viable alternative is to configure the L2PEs which will then in turn signal information to the L3PEs.

Figure 4:
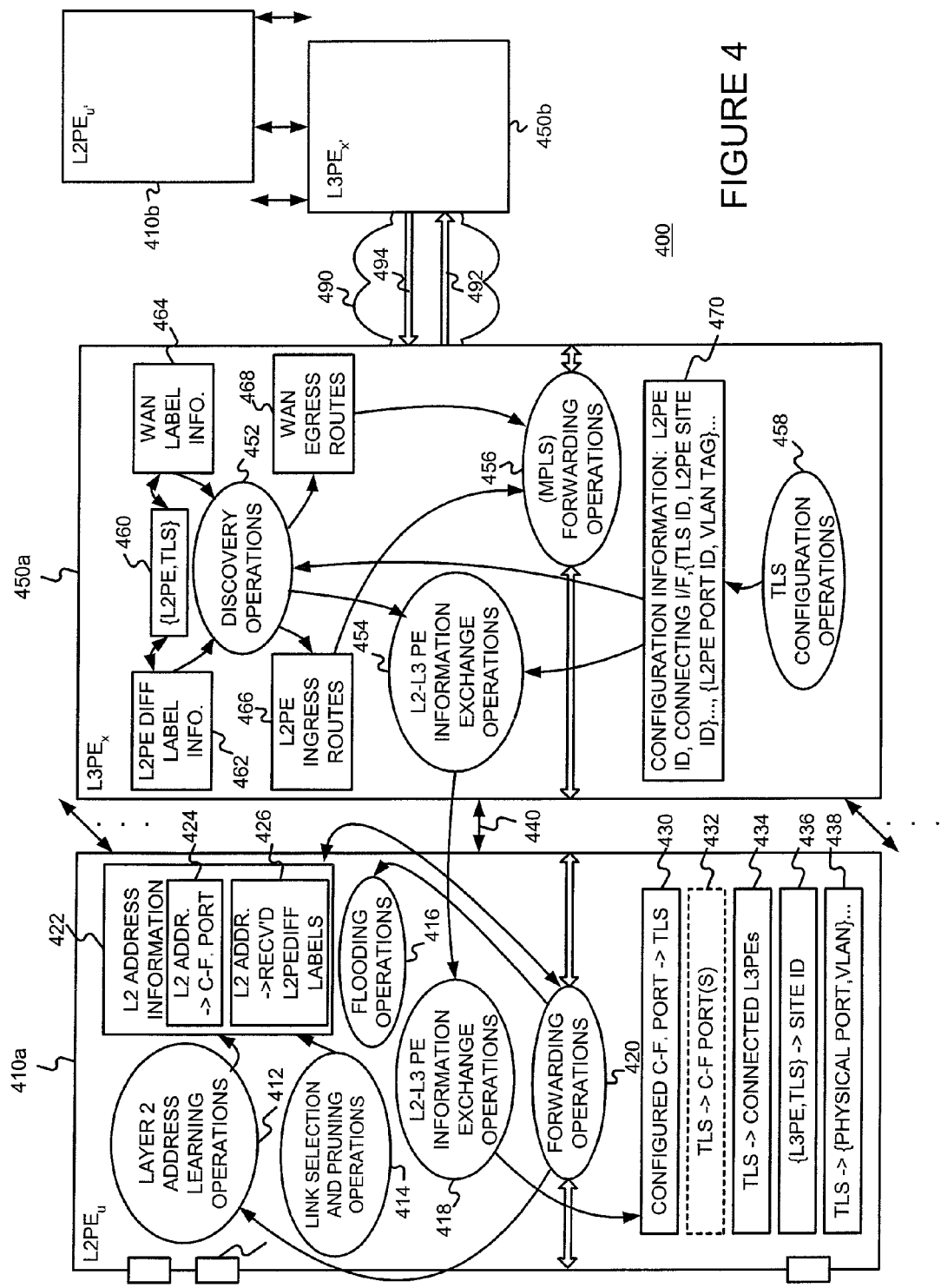
FIG. 4 is a bubble chart illustrating various operations that may be performed by, and various information that may be used by, layer 2 service provider edge devices (L2PEs), such as service provider MTUs for example, and L3PEs such as label-switching routers (LSRs) for example, in accordance with the present invention.

FIG. 4 is a bubble chart of operations that may be effected by, and data that may be stored by, both an L2PE and an L3PE to effect various aspects of the present invention. The $L3PE_x$ 450a may provide TLS configuration operations 458, discovery operations 452, L2PE-L3PE information exchange operations 454, and forwarding operations 456, and may store configuration information 470, L2PEDIFF label information 462 and WAN label information 464 for each L2PE,TLS pair, as well as L2PE routes 466 and WAN routes 468. Note that the L2PEDIFF labels are used to identify the L2PE that serves the addressed destination device and to identify the TLS. L2PE routes 466 and WAN routes 468 basically map this information to forwarding or routing information.

TLS configuration operations 458 may be used to accept configuration information 470. How such configuration information is received is not critical, and such information may be manually entered and received via a user interface (not shown). Configuration information 470 may include information for each L2PE connected and each TLS supported, or to be supported by the connected L2PE. As depicted in FIG. 4, in one exemplary embodiment, configuration information 470 may include, for each L2PE, an L2PE identifier and an interface (terminating a link) to the L2PE, and for each TLS supported by, or to be supported by, that L2PE, a TLS identifier, and L2PE site identifier (in the context of the particular TLS). Each TLS of each L2PE may also include configuration information defining L2PE port identifiers and VLAN tags associated with that TLS and L2PE.

Discovery operations 452 (or some other operation, not shown) may be used to generate, for each L2PE,TLS pair configured, L2PEDIFF label information 462, and WAN label information 464. Such label information may be a set of labels which may be defined by a label base, an offset, and a label range. (See, e.g., U.S. patent applications entitled "TRANSPORT NETWORKS SUPPORTING VIRTUAL PRIVATE NETWORKS AND CONFIGURING SUCH NETWORKS", by Kireeti Kompella, filed on May 24, 2001 and assigned Ser. No. 09/865,050, and entitled "EDGE DEVICES FOR PROVIDING A TRANSPARENT LAN SEGMENT SERVICE AND CONFIGURING SUCH EDGE DEVICES", by Yakov Rekhter, filed on Apr. 16, 2002 and assigned Ser. No. 10/123,353 (Referred to as "the Rekhter application"), each incorporated herein by reference.) For a TLS, a single, contiguous set of labels (with no offset) should suffice. If not, a number of non-overlapping sets of labels can be defined using offsets. A flooding label, corresponding to a TLS, may also be exchanged between the L2PE and $L3PE_x$ for the purpose of flooding or broadcasting packets within the TLS. Doing so shifts the burden of replication from the L2PE to $L3PE_x$ and reduces traffic between the L2PE and L3PE$_x$. WAN label information 462 uses non-overlapping labels at L3PE. Similarly, L2PEDIFF label information 464 uses non-overlapping labels at L3PE. Each set of WAN label information 462 for a given L2PE, TLS pair corresponds to one set of L2PEDIFF label information 464—in one embodiment, the only difference is the label base. It is permitted to have some WAN labels to overlap some L2PEDIFF labels L3PE$_x$, although this can easily be avoided if desired.

Discovery operations 452 can also signal TLS information to other L3PEs. In one exemplary embodiment, such signaling is performed using WAN advertisements, sent to other L3PEs. An exemplary WAN advertisement may include an L3PE identifier identifying the source L3PE of the advertisement, a TLS identifier, an L2PE site identifier, and label information (e.g., expressed by a label base, a label range and an optional label offset). Although topology information may also be advertised or configured, in one embodiment, tunnels are defined connecting all L3PEs such that each of the TLSs is fully meshed. An L3PE receiving a WAN advertisement can generate WAN routing information 468 based, at least in part, on information in that advertisement. Discovery operation 452 can also send (e.g., via the L2PE-L3PE information exchange operations 454) L2PEDIFF label information 462 to attached L2PEs, and generate L2PE routing information 466.

Finally, forwarding operation(s) 456 can use L2PE routes 466 to properly forward (L2PEDIFF labeled) packets received from an attached L2PE, and can use WAN routes 468 to properly forward (TLS labeled) packets from the transport network to an appropriate L2PE.

Referring now to the exemplary L2PE$_u$ 410$a$, this L2PE$_u$ 410$a$ may provide extended L2 address learning operations 412, extended link/path selection and pruning (e.g., spanning tree) operations 414, extended flooding operations 416, L2PE-L3PE information exchange operations 418 and forwarding operations 420, and may store L2 address to customer-facing port mappings 424, L2 address to received labels mappings 426, and various configuration information 430, 432, 434, 436, and 438.

The configuration information may be provided to L2PE$_u$ 410$a$ from an attached L3PE, via L2PE-L3PE information exchange operations 418. Alternatively, or in addition, such information may be provided directly at L2PE, 410$a$ via configuration operations (not shown), such as a user interface for inputting configuration information. The configuration information may include information 430 mapping each customer-facing port to a TLS (where the port is used as a lookup key), information 432 mapping each TLS to a customer facing port (where the TLS label is used as a lookup key), information 434 mapping each TLS to connected L3PEs (and preferably identifying one L3PE through which all traffic for that TLS is to be sent), information 436 for mapping each associated L3PE,TLS pair to an L2PE site identifier, and information 438 mapping each TLS to one or more physical ports and virtual LANs.

Customer-facing port mappings 424 maps an L2 address to a customer-facing port, and labels mapping 426 maps an L2 address to a received label (to be used as an L2PEDIFF label) may be provided by extended L2 address learning operations 412.

L2PE forwarding operations 420 may be used by L2PE$_u$ 410$a$ to forward packets received from customer-facing ports, as well as packets received from an L3PE. In the exemplary embodiment shown, if a packet is received by L2PE$_u$ 410$a$ from a customer-facing port, the destination L2 address is looked up in L2 address information 422 (e.g., the MAC address cache). If the address matches a local entry, L2PE$_u$ 410$a$ places the packet on the appropriate customer-facing port, while if the address matches a remote entry, L2PE$_u$ 410$a$ applies the corresponding L2PEDIFF label to the packet before it is forwarded to the appropriate L3PE. If no matching entry is found, L2PE$_u$ 410$a$ may invoke flooding operations 416. Basically, flooding operations 416 are used by L2PE$_u$ 410$a$ as an interim way of getting a packet to its destination when the L2PE$_u$ 410$a$ doesn't have adequate information about the location of the destination (e.g., about the L2PE or CE device with which the destination device is associated).

Extended link selection and pruning operations 414 may be used by L2PE$_u$ 410$a$ to select a path or interface associated with one of a number of incoming packets having the same L2 source address—such as may occur when the packet is flooded. Extended link selection and pruning operations 414 may be run across the customer-facing ports of L2PE$_u$ 410$a$, and may be run across the transport network (though not running it across the transport network is also possible in another embodiment).

FIG. 17 is block diagram of a machine 1700 which may effect one or more of the operations and/or store the data discussed above. Machine 1700 basically includes a processor 1710, an input/output interface unit 1730, a storage device 1720, and a system bus 1740 for facilitating the communication of information among the coupled elements. An input device 1732 and an output device 1734 may be coupled with the input/output interface 1730. Although the present invention may be effected on a machine 1700 having multiple processors, interface units, storage devices, and/or buses, etc., only one of each component is illustrated to simplify the drawing. Operations of the present invention may be effected by the processor 1710 executing instructions. The instructions may be stored in the storage device 1720 and/or received via the input/output interface 1730. The instructions may be functionally grouped into processing modules.

Machine 1700 may be a device that aggregates CEs such as L2PEs, for example, or a device that acts as an L3PE such as router, for example. In an exemplary L2PE, or in an exemplary L3PE, processor 1710 may include a microprocessor, a network processor, and/or (e.g., custom) integrated circuit. In the exemplary router, storage device 1720 may include ROM, RAM, SDRAM, SRAM, SSRAM, DRAM, flash drive(s), hard disk drive(s), flash cards, or some combination of these. Storage device 1720 may include program instructions. An exemplary L2PE may be an enhanced MTU. In an exemplary L3PE (e.g., router), these program instructions may define an operating system, one or more protocol modules, and/or other modules. In one embodiment, the methods of the present invention may be effected by a microprocessor executing stored program instructions (e.g., defining a part of the protocol daemon). At least a portion of the machine executable instructions may be stored (temporarily or more permanently) on storage device 1720 and/or may be received from an external source via input interface unit 1730. Finally, in the exemplary L2PE or L3PE, the input/output interface unit 1730, input device 1732, and output device 1734 may include interfaces to terminate communications links.

Naturally, the operations of the present invention may be effected on systems other than enhanced MTUs or enhanced routers. Such other systems may employ different hardware and/or software.

§4.4 EXEMPLARY METHODS AND DATA STRUCTURES, WITH EXAMPLES OF OPERATION

As introduced in §4.2 above, three high-level applications may be performed by the present invention—configuring service provider devices (e.g., L3PEs and L2PEs) to support TLS services, provisioning transparent LAN segments, and data forwarding. Exemplary methods and data structures that may be used to effect these applications are described in §§4.4.1, 4.4.2 and 4.4.3, respectively, below.

§4.4.1 CONFIGURATION

Recall that one high-level application of the present invention may be to facilitate the configuration of the transport network, including the L2 and L3 service provider edge devices. Recall further that to avoid the need to make global changes (i.e., to all L2PEs and L3PEs) to configuration information each time a port is added to a TLS, or each time a new TLS is added, the present invention may permit the service provider to configure ports locally (i.e., at the given L2PE having the added port, or at its associated L3PE). Once local information to the relevant local L2PE and/or L3PE is provided, and label information that needs to be unique only at the L3PE (not globally) is determined, signaling or discovery protocols may be used to disseminate certain information and flooding and learning techniques may be used to acquire other information.

Figure 11:
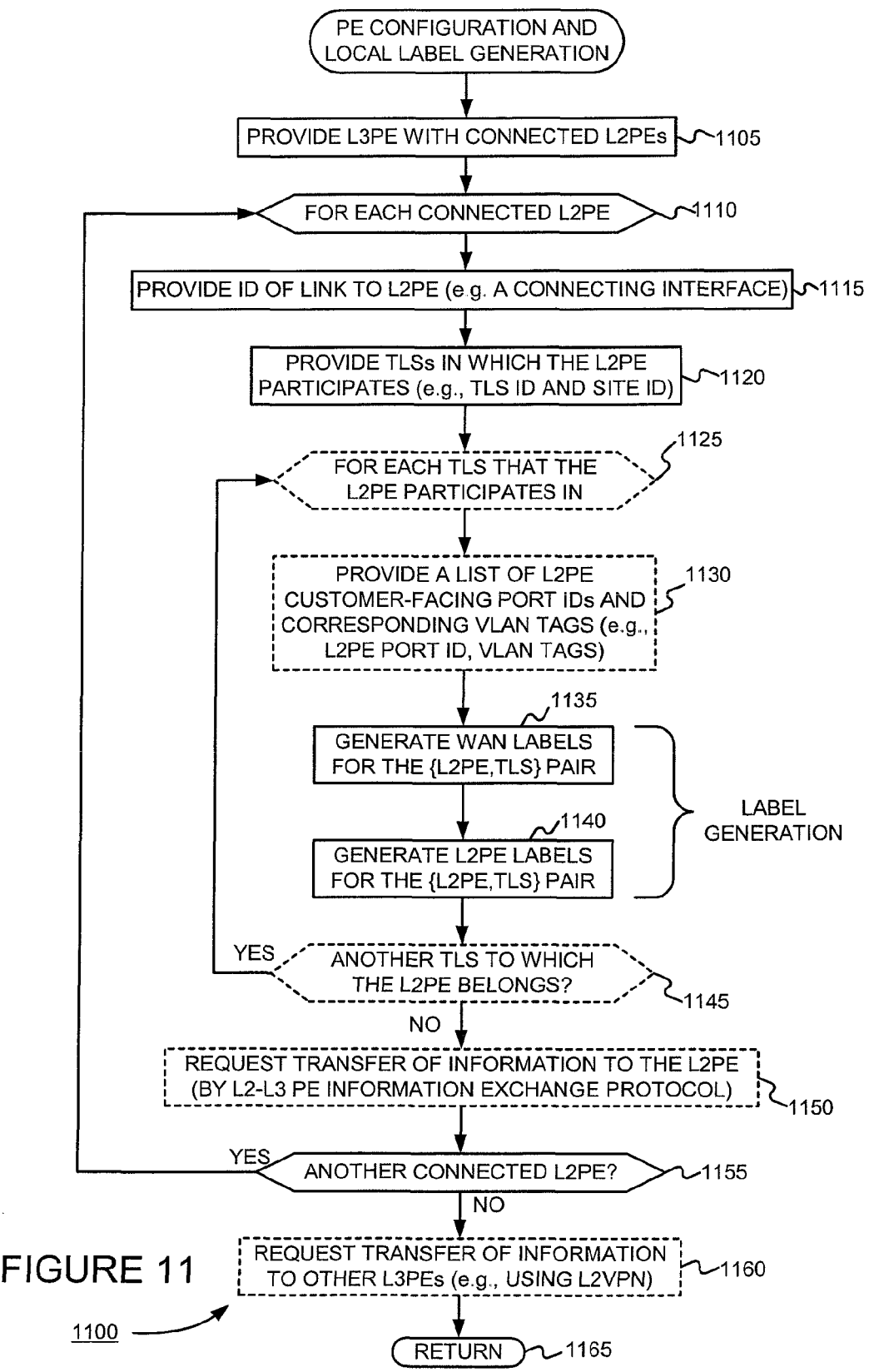
FIG. 11 is a flow diagram illustrating an exemplary method that may be used to provide configuration information to an L3PE and to provide or generate labels.

FIG. 11 is a flow diagram of an exemplary method 1100 that may be used to effect TLS configuration operations 458. Method 1100 may be effected locally, such as by L3PE$_u$ 450a. "Provided information" refers to information that may be accepted from another site, read from a storage medium, accepted as manual input from a user interface, or some combination of these. The L3PE may be provided with any connected L2PEs (act 1105). As indicated by loop 1110-1155, information may be provided (or generated) for each of the connected L2PEs. For example, since each L2PE will have at least one link (directly or indirectly) to it, such a link is identified, for example, by identifying the interface terminating the link (act 1115). For each L2PE, one or more TLS in which the L2PE participates is or are provided (act 1120). A TLS identifier may be used for this purpose. Further, since an L2PE may participate in more than one TLS, it may have a different site identifier for each such TLS. FIG. 6 is a block diagram which illustrates the relationship of such data, as well as an exemplary data structure 600 to accommodate such information. As shown, an L2PE connected with the L3PE is identified by an L2PE identifier (e.g., an IP address) 610, and can be communicated with via a connecting interface 620. Further, each connected L2PE may support one or more TLS (e.g., an eight octet route distinguisher) 630, and in each case will have a site ID (e.g., a two octet integer) 640 for the particular TLS. Each TLS may also have one or more associated pairs of L2PE customer-facing port identifiers 660 (e.g., a two octet integer) and VLAN tags 650 (e.g., a two octet (12-bit) 802.1q tag).

Returning to FIG. 11, a nested loop 1125-1155 defines acts that may be performed for each TLS that the given L2PE participates in. For example, a list of L2PE customer-facing port identifiers (e.g., as an L2PE port identifier) and corresponding virtual LAN tags may be provided (act 1130). Although such a list may be provided directly to the L2PE, in the illustrated embodiment, it is provided via the L3PE and transferred to the appropriate L2PEs. WAN labels and L2PEDIFF labels associated with the L2PE,TLS pair are generated (acts 1135, 1140). Referring to FIG. 5, a set of labels may be defined by a label block, starting at a label base, and having a number of labels corresponding to a label range. If the number of labels initially provisioned in a label block becomes insufficient, or if it is desired to add more labels, the label block can be extended, a new (bigger) label block can be created, or a label offset can be used to define the start of an additional block of labels. The acts shown in phantom may be performed if all TLS configuration is to be done at the L3PE. Further, instead of performing acts 1150 and 1160, an indication that the information is available (for transfer or advertisement) may be provided.

FIG. 7 is a block diagram that illustrates the relationship of such data, in the form of exemplary data structures 710, 720, and 730 (Recall stored data 460, 462, and 464 of FIG. 4.) that may be used to store such data. As shown, each L2PE may support one or more TLS. The list 710 illustrates TLS identifiers supported by a given L2PE. For each TLS, the L2PE will have a given L2PE site identifier 722, 732, and for each TLS, a set of L2PEDIFF labels 462 and a set of WAN labels 464 are provided. The set of L2PEDIFF labels 720 for a given TLS of a given L2PE may include a label base 726 and a label range 728. If more labels are needed, a label block offset 724 may also be provided. Similarly, the set of WAN labels 730 for a given TLS of a given L2PE may include a label base 736 and a label range 738. If more labels are needed, a label block offset 734 may also be provided. In one embodiment, each set of L2PEDIFF labels for a given L2PE,TLS pair corresponds to a set of WAN labels, with the only difference being the label base.

All sets of WAN labels generated by (or provided at) a given L3PE are non-overlapping. Similarly, all sets of L2PEDIFF labels generated by (or provided at) a given L3PE for a given L2PE are non-overlapping. At a given L3PE, WAN labels may overlap L2DIFF labels, although the present invention may be implemented such that they are non-overlapping at a given L3PE.

Referring back to FIG. 11, the method 1100 may effect the transfer, or request or note the possibility of a transfer (e.g., by the L2-L3 PE information exchange operation 454), of this information to the L2PE (act 1150). This method may also be used to transfer information from the L2PE to the L3PE. In one embodiment, L2PEDIFF labels may be defined by a label base, a site ID offset, a number of sites (the range), and a bit vector (e.g., in octets=the number of sites in the range/8) of currently active sites.

§4.4.2 PROVISIONING TRANSPARENT LAN SEGMENTS OF VIRTUAL LANS

Recall that one high level application of the present invention may be to provision one or more TLS. In this regard, label information may be generated at each L3PE (e.g., blocks 1135 and 1140 of FIG. 11), and signaling or discovery protocols may be used to disseminate label information, among other things (e.g., L3PE identifiers, L2PE identifiers, TLS identifiers), to other L3PEs, and other information to attached L2PEs. (See, e.g., block 1160 of FIG. 11 which requests, or notes the possibility of, (e.g., a the TLS discovery operation 452) the transfer of this information to other L3PEs.) L3PEs receiving such signaling may then update WAN and L2PE forwarding information related to the TLS. L2PEs receiving such signaling may update L2PEDIFF label information. The L2PEs can also learn layer 2 addresses based on received packets. If an L2PE doesn't have appropriate layer 2 address information, it can use flooding on an interim basis until such information is provided or learned.

§4.4.2.1 DISCOVERY

Figure 12:
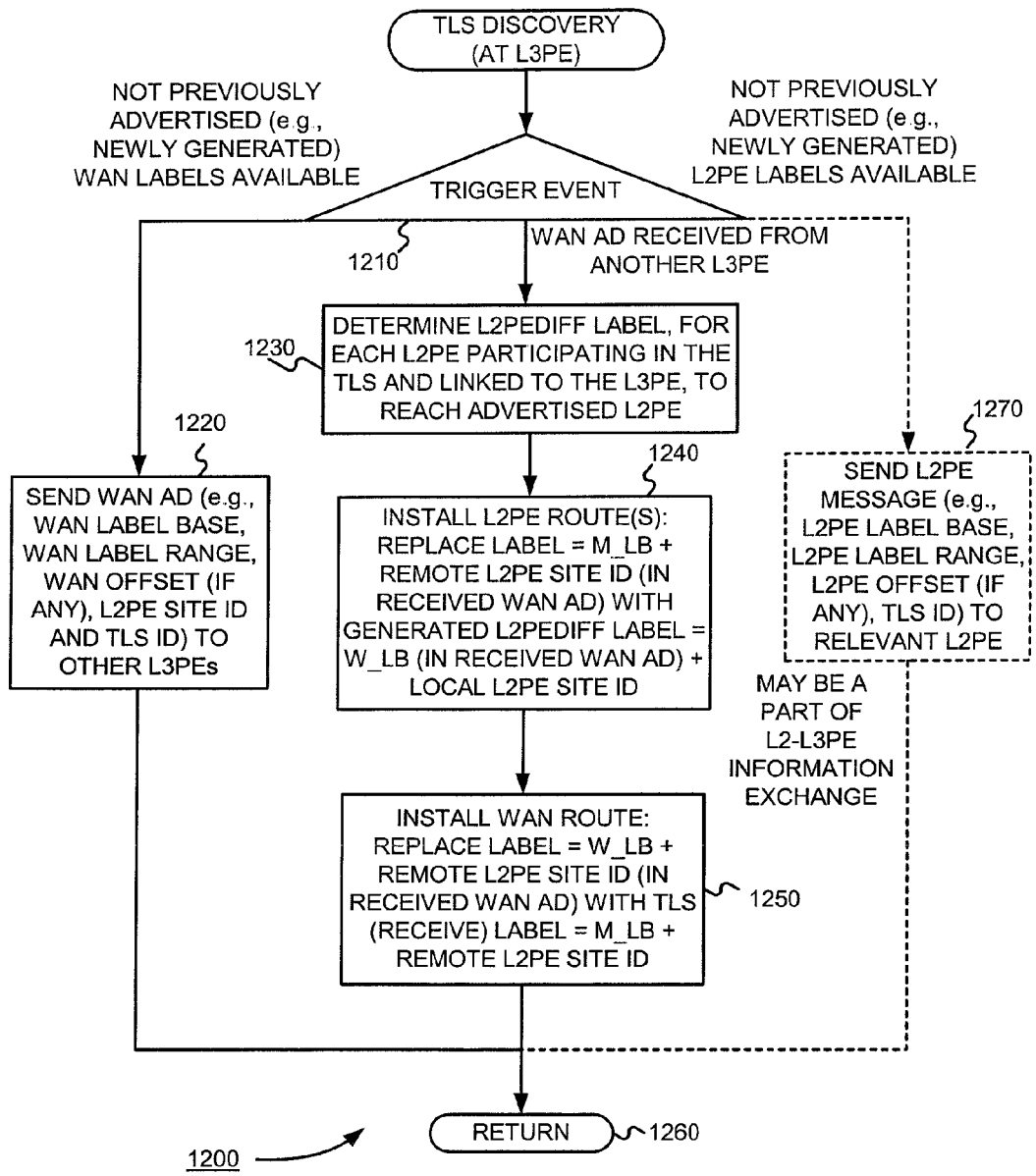
FIG. 12 is a flow diagram illustrating an exemplary method that may be used to perform TLS discovery operations at an L3PE.
Figure 13:
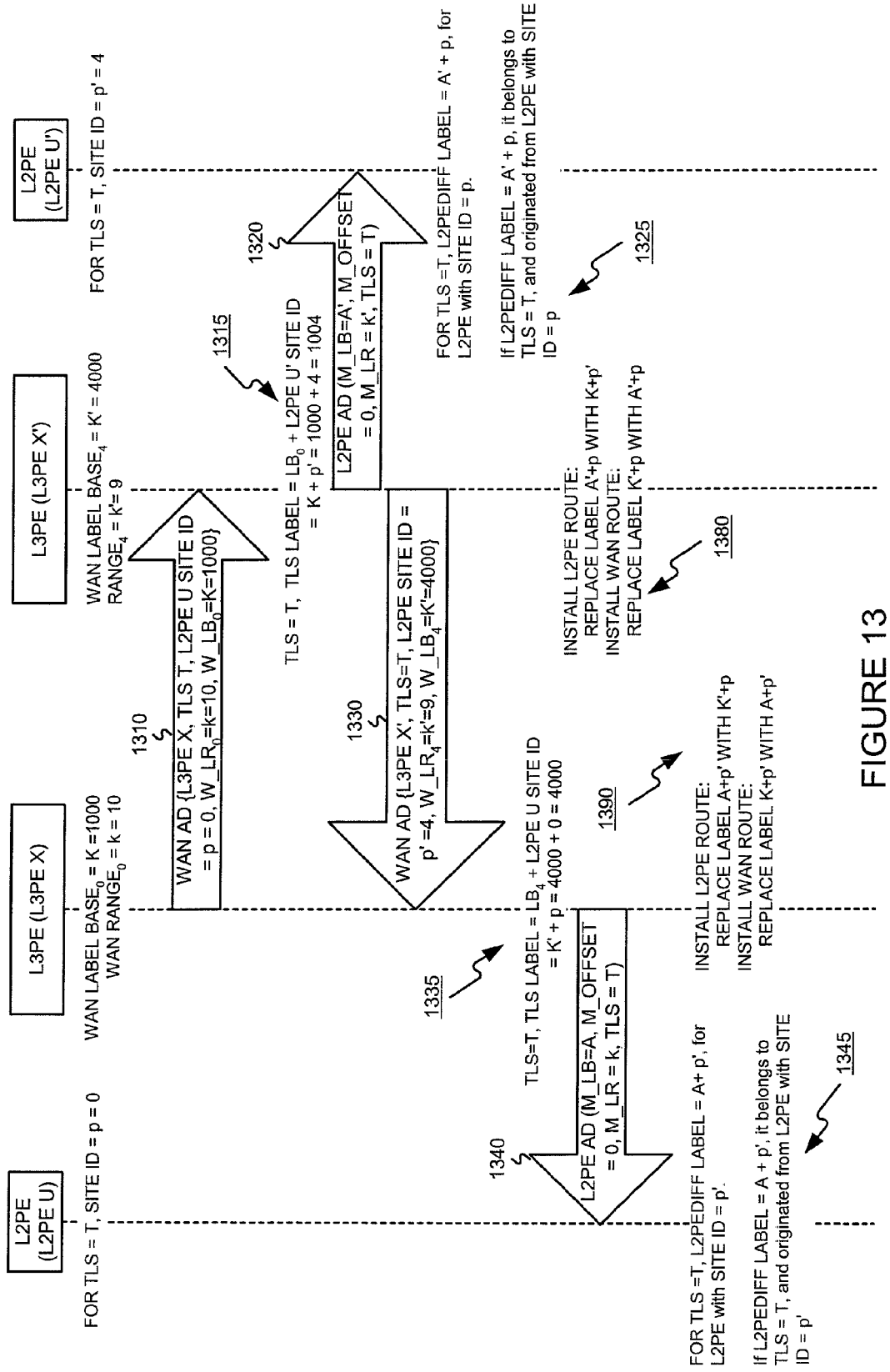
FIG. 13 is a messaging diagram of an example that illustrates how TLS discovery takes place in accordance with the exemplary method of FIG. 12.

FIG. 12 is a flow diagram of an exemplary method 1200 that may be used to effect discovery operations 452. Various branches of method 1200 may be effected in response to various trigger events (act 1210). For example, if not previously advertised (e.g., newly generated) WAN labels are available, the L3PE may send a WAN advertisement to other L3PEs as indicated (act 1220). Such an ad may include the TLS identifier, the L2PE site identifier in the context of the identified TLS, a WAN label base, a WAN label range, and a WAN label offset (if needed). Communication 1310 of FIG. 13 illustrates such an advertisement Referring back to block 1210, if a WAN advertisement is received from another L3PE, then, for each L2PE participating in the advertised TLS and linked with the L3PE, an TLS (send) label to reach the advertised L2PE is determined (act 1230). This may be done by adding the WAN label base received in the WAN advertisement with the particular L2PE's site identifier in the context of the TLS. Referring to the Example of FIG. 13, L3PE X' determines this TLS (send) label as $LB_0$+L2PE U' site ID=K+p'=1000+4=1004. Similarly, L3PE X determines this TLS (send) label as $LB_4$+L2PE U site ID=K'+p=4000+0=4000. Referring to block 1240, these generated TLS (send) labels may be installed as L2PE routes. FIG. 8 is a block diagram illustrating an exemplary data structure 800 that may be used to store such L2PE routes 466. Each L2PE route may include an L2PEDIFF label in 810, a TLS (send) label out 820, and a tunnel 830. The L2PEDIFF label (in) 810 may be the sum of L2PEDIFF label base for the TLS and the L2PE site identifier of the L2PE identified in the received advertisement. The TLS (send) label (out) 820 may be the sum of the advertised label base and the L2PE site identifier, in the context of the TLS, of an L2PE linked with the L3PE. Referring to the example of FIG. 13, at L3PE X', the L2PEDIFF label (in) is A'+p and the TLS (send) label (out) is K+p'=1004. At L3PE X, the L2PEDIFF label (in) is A+p' and the TLS (send) label (out) is K'+p=4000. The tunnel label 830 may be determined in a known manner and links the L3PE receiving the advertisement with the L3PE that sources the advertisement.

Then, as indicated by block 1250, WAN routes may be installed. FIG. 9 is a block diagram illustrating an exemplary data structure 900 that may be used to store such WAN routes 468. Each WAN route may include a TLS (receive) label 910, an L2PEDIFF label 920, and a specified link to the desired L2PE 930. The TLS (receive) label (in) 910 may be the sum of the WAN label base of the L3PE for an L2PE of the TLS, and the L2PE site ID in the received advertisement. The L2PEDIFF label (out) 920 may be the sum of the L2PEDIFF label base of the L2PE and the L2PE site ID in the received advertisement. Referring to FIG. 13, at L3PE X', the TLS (receive) label is K'+p=4000+0=4000, and the L2PEDIFF label (out) is A'+p. At L3PE X, the TLS (receive) label is K+p'=1000+4=1004, and the L2PEDIFF label (out) is A+p'. The link to the L2PE can be determined by looking up the connecting interface for the relevant connected L2PE. (See, e.g., 620 and 610 of FIG. 6.)

Referring back to FIG. 12, if L2PEDIFF labels that have not been previously communicated to the L2PEs (e.g., newly generated L2PEDIFF labels) are available (act 1210), then, an L2PE message is sent to the relevant L2PE (act 1270). This message may be a part of the L2PE-L3PE information exchange operations 454. An L2PE message may include the L2PEDIFF label base, the L2PEDIFF label range, L2PEDIFF label offset (if any), and a TLS identifier, or, alternatively, may just include the L2PEDIFF label and the TLS. Referring to FIG. 13, communications 1320 and 1340 illustrate the communication of such advertisements.

As can be appreciated from the foregoing, all TLS packets to or from the L2PE from or to its L3PE are sent as L2PEDIFF or TLS labeled packets (e.g., the entire Ethernet frame less the preamble and checksum is encapsulated in an MPLS frame with a label stack having one or more labels). This label encodes both the TLS to which the packet belongs, as well as the source (for packets received) or destination CE or L2PE (for packets sent).

Referring to FIG. 13, L2PE U uses label (A+p') to send to L2PE with site ID p' (i.e., L2PE U') and L3PE X replaces that label with label (K'+p) to send packets from L2PE U to L2PE U'. L2PE U also knows that packets received with label (A+p') belong to TLS T and were originated at the L2PE site ID=p'.

Suppose that L2PE U was dual homed (i.e., had another uplink) to another L3PE (L3PE Z, not shown) and another L2PE (L2PE V, not shown) was dual homed to the same L3PE, and another L3PE (L3PE Y, not shown). For each L3PE, the L3PE shows the WAN label range announced to other L3PEs, as well as the L2PEDIFF label range sent to its L2PE. A dual homed L2PE is given a distinct site identifier for each uplink, whether to the same L3PE or to a different L3PE. An L3PE allocates and announces WAN and L2PEDIFF label ranges for each L2PE to which it is connected, even if it is the same L2PE over different links.

§4.4.2.2. LEARNING

Referring to FIGS. 4 and 10, at $L2PE_u$ 410a, forwarding operations 420 may use L2 address information 422 to properly forward packets—if the destination device is local (i.e., associated with a customer-facing port), forwarding information 424 uses the destination L2 address to find the appropriate customer-facing port, while if the destination device is associated with some other L2PE of the TLS, forwarding information 426 uses the destination L2 address to find the appropriate L2PEDIFF label. FIG. 10 is an exemplary data structure 1000 which may be used to store both types of information and has a number of entries, each of the entries including a L2 address 1010, and either a customer-facing port 1020 or an L2PEDIFF label 1030. However, these entries may not be populated initially, or may not contain an entry for a needed destination L2 address. The L2 address learning operations 412 may use flooding operations 416 and known learning techniques to learn customer-facing ports 1020 associated with local destination L2 addresses, and may use modified flooding operations 416 and modified learning techniques to learn L2PEDIFF labels 1030.

Exemplary methods to effect such flooding and learning are described in the context of forwarding at an L2PE in §4.4.3 below.

§4.4.3 DATA FORWARDING

Forwarding (and Learning and Flooding) on the L2PE (Ingress and Egress)

Figure 14:
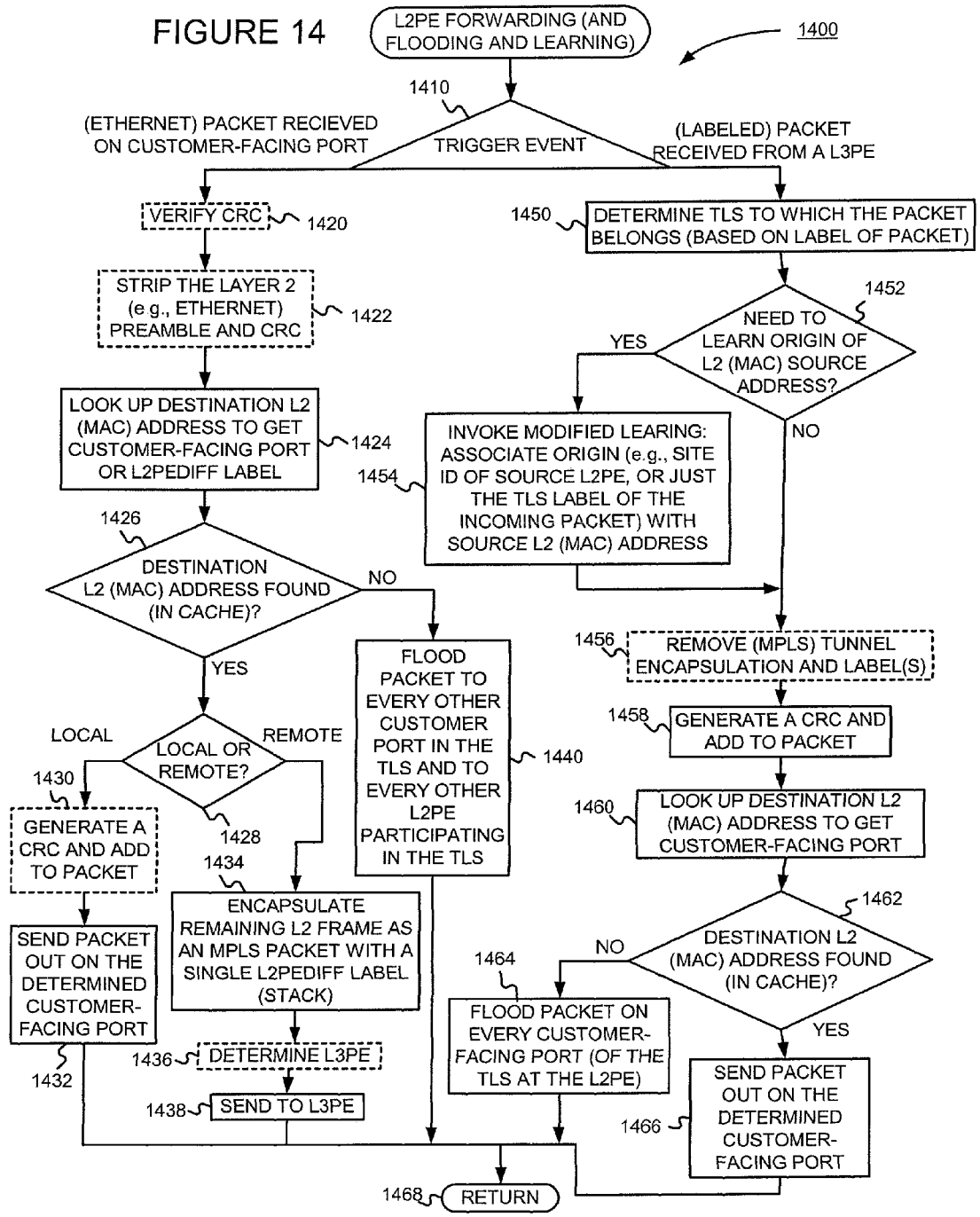
FIG. 14 is a flow diagram illustrating an exemplary method that may be used to perform packet forwarding operations at an L2PE, as well as performing flooding and learning operations at the L2PE.

FIG. 14 is a high level flow diagram of an exemplary method 1400 that may be used to effect forwarding operations 420, flooding operations 416, and L2 address learning operations 412 for an L2PE. The left or right branch of the method 1400 is carried out depending upon an event (act 1410). More specifically, if addressed data (e.g., an Ethernet packet) is received on a customer-facing port of the L2PE, in which case the L2PE could be thought of as the "ingress L2PE", the left branch is performed, whereas if (labeled) addressed data (e.g., a labeled packet) is received from a linked L3PE, in which case the L2PE could be thought of as the "egress L2PE", the right branch is performed.

If the L2PE acts as an ingress L2PE, that is, if addressed data is received on a customer-facing port, and if the addressed data is an Ethernet packet, then a cyclic redundancy code (CRC) may be verified (act 1420) and the Ethernet preamble and CRC may be removed (act 1422). Then, the L2 destination address is used to determine (e.g., lookup) a customer-side port (local destination) or an L2PEDIFF label (remote destination) (act 1424). If an L2 destination address is found (act 1426), it is determined whether or not it is local or remote (act 1428). If the destination address is local, a new CRC may be generated (act 1430) and the packet is sent out on the determined customer-facing port as indicated (act 1432), before method 1400 is left via RETURN node 1468. Returning back to act 1428, if the destination address is remote, the remaining L2 frame is provided with an L2PEDIFF label (e.g., a VLAN tag, a DLCI, an ATM virtual channel, an MPLS label (layer 2.5), etc.) (act 1434), and sent to a determined L3PE (e.g., using TLS-to-connected L3PE configuration information 434) (acts 1436 and 1438), before method 1400 is left via RETURN node 1468. FIG. 16A illustrates an example of a packet received at an ingress L2PE, having a remote L2 destination address.

Returning back to act 1426, if the destination L2 address is not found, then, as indicated by block 1440, the packet is flooded to every other customer port in the TLS at the given L2PE (e.g., using conventional flooding methods) and to every other L2PE participating in the TLS (referred to as "modified flooding"). This may be done by sending a copy of the packet with each L2PEDIFF label in the L2PE label ranges for that TLS (except the label corresponding to the L2PE itself) to the L3PE. If an L2PE has multiple connections to one or more L3PEs, it should flood the packet to each L3PE over each available connection. Flooding may also be used when the destination address is a broadcast or multicast address. Once the L2PE identifies which TLS a packet belongs to, it may flood the packet (e.g., send a copy of the packet out on multiple ports). Alternatively, this may be done by sending a single copy of the packet with a designated flooding label for that TLS to the L3PE. In this case, it is the L3PE's responsibility to make one copy of the packet for each remote L2PE in that TLS, and send each copy with the appropriate TLS label over the appropriate tunnel. That is, the packet replication is done by the L3PE instead of the L2PE. If the packet is received from an L3PE, it should be sent out on every customer port, and if the TLS is a full mesh, the packet need not be sent to any other L3PE or L2PE. If, on the other hand, the packet is received from an L3PE, but the TLS is not a full mesh, the L2PE may be responsible for flooding the packet to other L2PEs and/or L3PEs. The method 1400 is then left via RETURN node 1468.

Figure 16C:
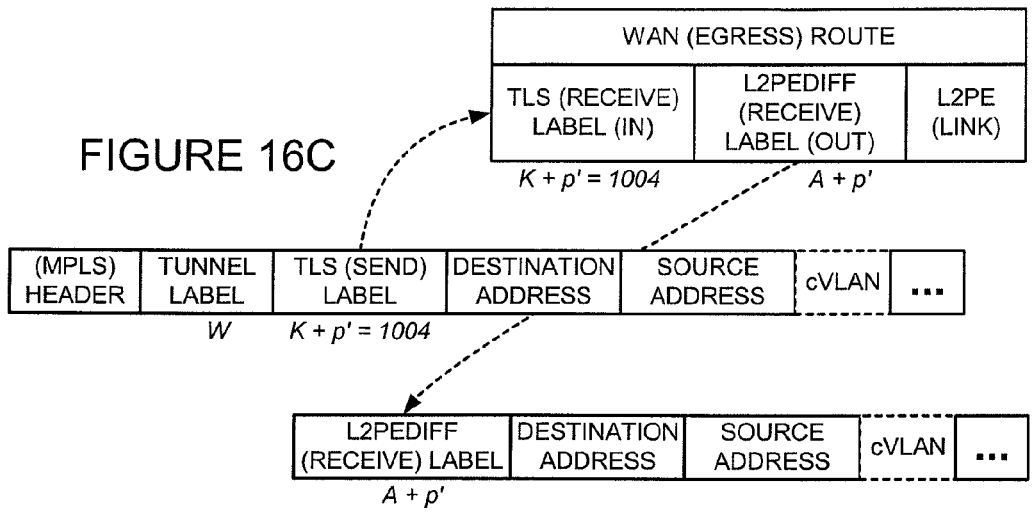
Figure 16D:
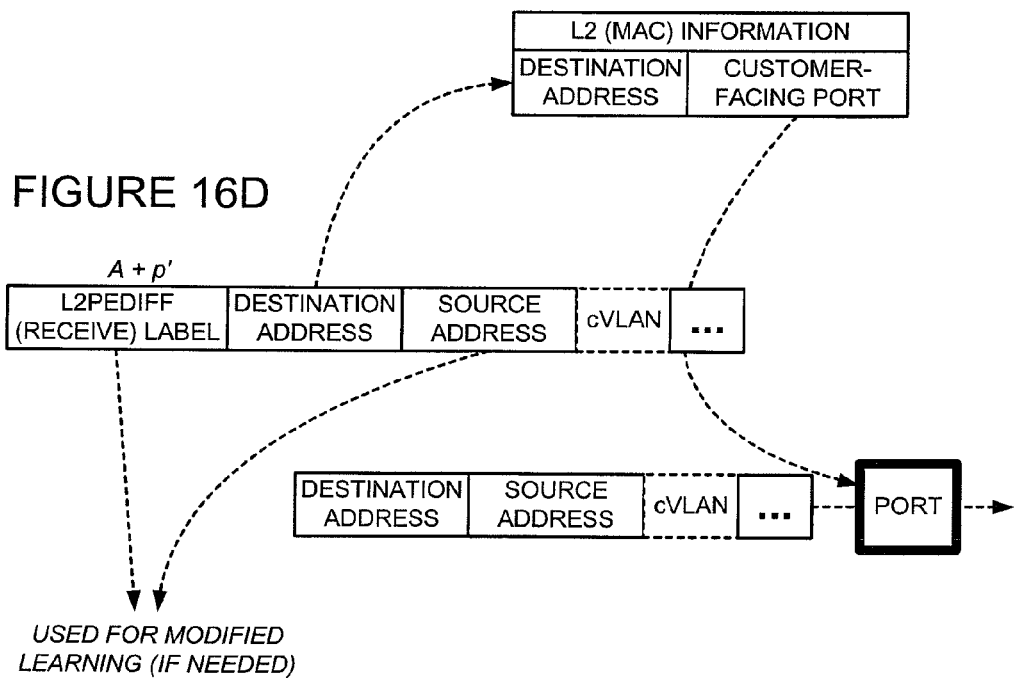

Returning back to act 1410, if the L2PE acts as an egress L2PE, that is, if a packet is received on an L3PE link, then it is determined which TLS the packet belongs to (based on its label), (act 1450). It is determined whether or not the L2PE needs to learn the L2 source address (act 1452). For example, recall that information 426 maps layer 2 addresses to received labels. If the layer 2 address to label mapping is already known, it needn't be learned and stored, and method 1400 proceeds directly to act 1456. If, on the other hand, this mapping is not already known, or if the mapping has changed, modified L2 address learning (e.g., operation 412) is invoked so that the site identifier of the source L2PE, or just the L2PEDIFF label of the incoming packet, is associated with the L2 source address (act 1454). The operational example of FIG. 16D illustrates how such information can be used for modified learning.

Tunnel (e.g., MPLS) encapsulation, if any, is then removed (act 1456), and the TLS and L2PEDIFF labels are removed. These labels may have already been removed (e.g., by the L3PE). Then, a CRC may be generated and added to the addressed data (e.g., a packet) (act 1458). Then, an attempt is made to use the destination L2 address to get the appropriate customer-facing port (act 1460). If the destination L2 address is found, the packet is sent out on the associated customer-facing port (acts 1462, 1466), before method 1400 is left via RETURN node 1468. FIG. 16D illustrates how such forwarding at an egress L2PE may be performed. On the other hand, if the destination L2 address is not found, the packet is flooded on every customer-facing port of the L2PE that belongs to the TLS (acts 1462 and 1464), before the method 1400 is left via RETURN node 1468. These operations may be carried out using, for example, flooding operations 416 and information 432 of FIG. 4.

As just described, packets may be flooded if the ingress L2PE doesn't have the L2 destination address (acts 1426 and 1440). In such a case, an L2PE may receive multiple copies of a flooded packet with a given L2 source address if it and/or the ingress L2PE (which initiated the flooding) is connected with multiple L3PEs. Each copy of the packet may be received with a distinct {incoming interface, L2PEDIFF label} pair. In such a case, the receiving L2PE may choose a single {outgoing interface, L2PEDIFF label} pair that it will use to forward a packet to the L2 source address. This scenario is similar to multiple ports connected two bridges, so a known spanning tree algorithm may be used to select an {outgoing interface, L2PEDIFF label} pair that it will use to forward a packet to the L2 source address. If the TLS is fully meshed, the L2PE can autonomously choose which {outgoing interface, L2PEDIFF label} pair to use to send packets to the L2 source address. That is, if the TLS is fully meshed, the L2PE need not run a spanning tree algorithm across the metro or wide area, which may be preferable to some transport network service providers. If, on the other hand, the TLS is not fully meshed, each L2PE in the TLS may treat multiple incoming L2PEDIFF labels for a given L2 address as multiple parallel ports to the same "bridge" (i.e., to the same L2PE) and use a selection and pruning technique, such as a spanning tree algorithm, to pick the active port (i.e., label) to use to reach the L2 address. Alternatively, the L2PE may use an interior gateway protocol (IGP) or configuration to select one of a number of incoming L2PEDIFF labels to use to map to a given L2 source address.

If an L2PE is multi-homed (i.e., if it has multiple uplinks to one or more L3PEs, and therefore multiple paths to the transport network), it may balance its communications load across these links (e.g., using known load balancing techniques). Load balancing decisions can be made locally at the L2PE. If load balancing is to be employed, an important consideration is to ensure (e.g., by using the same path) that packets to the same destination are not reordered. However, this can be challenging, since broadcast or multicast packets may be to the same destination. In one embodiment of the present invention in which load balancing is employed, the same uplink is used for all packets of a given TLS (to avoid packet reordering), while different TLSs or groups of TLSs can be assigned to different uplinks (to achieve at least some degree of load balancing).

Forwarding on the L3PE (Ingress and Egress)

Figure 15:
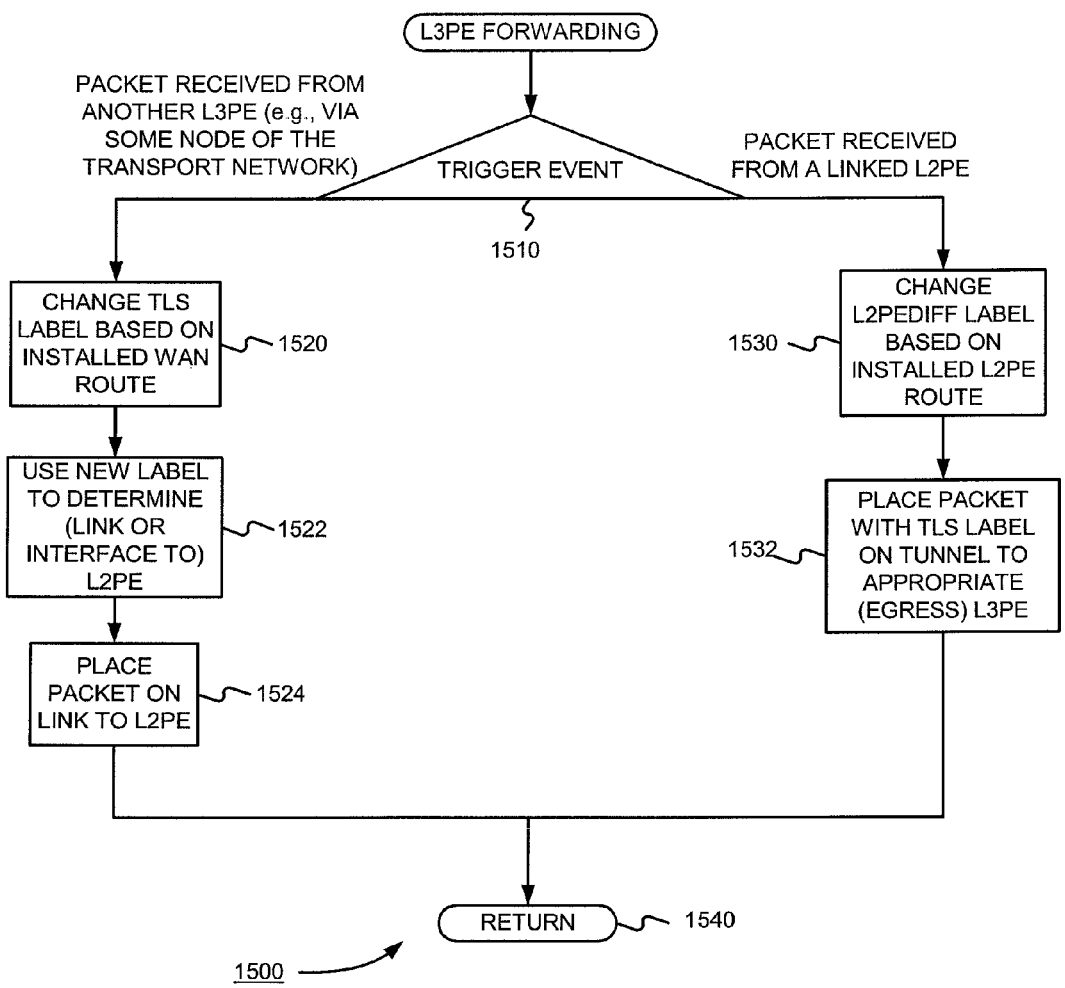
FIG. 15 is a flow diagram illustrating an exemplary method that may be used to perform packet forwarding operations at an L3PE.

FIG. 15 is a flow diagram of an exemplary method 1500 that may be used to effect forwarding operations 456 for an L3PE. The left or right branch of method 1500 is carried out depending upon an event (act 1510). More specifically, if a (TLS labeled) packet is received from another L3PE (or some other node of the transport network), in which case the L3PE could be thought of as the "egress L3PE", the left branch is performed, whereas if a (L2PEDIFF labeled) packet is received from a linked L2PE, in which case the L3PE could be thought of as the "ingress L3PE", the right branch is performed.

If the L3PE is an ingress L3PE, and a packet is received from a linked L2PE, the L2PEDIFF label is changed based on an installed L2PE route (act 1530). For example, in data structure 800 of FIG. 8 an L2PEDIFF label (in) 810 is replaced by a TLS (send) label (out) 820. The TLS labeled packet is then placed on a tunnel to the appropriate egress L3PE (act 1532). Again, for example, in data structure 800 of FIG. 8 a tunnel 830 is associated with the L2PEDIFF label 810. Method 1500 is then left via RETURN node 1540. FIG. 16B illustrates an example of forwarding a packet received from a linked L2PE.

Returning back to act 1510 of FIG. 15, if the L3PE is an egress L3PE, and a labeled packet is received from another L3PE directly or via some other node of the transport network, then the TLS label is changed based on an installed WAN route (act 1520). For example, in data structure 900 of FIG. 9 a TLS (receive) label (in) 910 is replaced with an L2PEDIFF label (out) 920. The appropriate L2PE is determined and the packet is placed on the link to the determined L2PE (acts 1522 and 1524), before method 1500 is left via RETURN node 1540. FIG. 16C illustrates an example of forwarding a packet to a linked L2PE A port can be treated as a LAN segment, or a VLAN on a port can be treated as a LAN segment. This configuration information is available at the L2PE.

§4.5 CONCLUSIONS

As can be appreciated from the foregoing detailed description, the present invention permits a service provider to provide a transparent LAN segment service over a transport network. This service is easy to provision. Further, it is easy to add more ports and TLSs. Finally customers can use a mature, inexpensive technology, such as Ethernet LANs, without the geographic limitations traditionally found in such technologies. Finally, the service provider's transport network is protected against malicious or incompetent customers.

To reiterate, although the invention was described with respect to packets, it may be used with any type of data transport entity. Further, although the invention was described with respect to a transport network using label switching, it may be used in other types of transport networks. Finally, a L3PE can support schemes consistent with the principles of the present invention in addition to supporting other schemes, such as those described in the Rekhter application. For example, an L3PE can support schemes consistent with the principles of the present invention when connected with an L2PE, and also support schemes described in the Rekhter application when connected directly with a customer.

What is claimed is:

1. A method for generating, by a transport network device of a second type, information about a newly added port belonging to a linked device of a first type and associated with a transparent LAN segment, the information to be disseminated to other devices of the second type, the method comprising:
    a) obtaining, by the transport network device, a set of labels associated with the newly added port; and
    b) generating, by the transport network device, at least one message, the at least one message collectively including
        i) a first field for identifying the device of the second type;
        ii) a second field for identifying the transparent LAN segment to which the newly added port belongs,
        iii) a third field for identifying the device of the first type in the context of the transparent LAN segment, and
        iv) a fourth field for identifying the set of labels.

2. The method of claim 1 wherein the set of labels is defined by a label base value and a label range value.

3. The method of claim 1 wherein the set of labels is contiguous.

4. The method of claim 1 further comprising:
    c) sending, by the transport network device, the at least one message towards other devices of the second type belonging to the transport network.

5. The method of claim 4 wherein the at least one message is associated with a group for targeting the distribution of the at least one message.

6. The method of claim 5 wherein the at least one message is sent using a border gateway protocol, and
    wherein the group is a route target BGP extended community.

7. The method of claim 5 further comprising:
    d) generating, by at least one of the other devices of the second type belonging to the transport network, and using contents included in the at least one message, information used to communicate data to the linked device of the first type associated with the newly added port; and
    e) storing the generated information used to communicate data.

8. The method of claim 1 wherein the at least one message further collectively includes:
    vi) a fifth field for defining an extension to the set of labels, wherein the extension is defined by a second label base, a second label range, and label block offset.

9. A transport network device of a second type for generating information, the transport network device comprising:
    a) an input obtaining a set of labels associated with a newly added port belonging to a linked device of a first type and associated with a transparent LAN segment; and
    b) at least one processor generating at least one message, the at least one message collectively including
        i) a first field for identifying the device of the second type,
        ii) a second field for identifying the transparent LAN segment to which the newly added port belongs,
        iii) a third field for identifying the device of the first type in the context of the transparent LAN segment, and
        iv) a fourth field for identifying the set of labels.

10. The transport network device of claim 9 wherein the set of labels is defined by a label base value and a label range value.

11. The transport network device of claim 9 wherein the set of labels is contiguous.

12. The transport network device of claim 9 wherein the at least one processor further sends the at least one message towards other devices of the second type belonging to the transport network.

13. The transport network device of claim 12 wherein the at least one message is associated with a group for targeting the distribution of the at least one message.

14. The transport network device of claim 13 wherein the at least one message is sent using a border gateway protocol, and wherein the group is a route target BGP extended community.

15. The transport network device of claim 9 wherein the at least one message further collectively includes:

vi) a fifth field for defining an extension to the set of labels, wherein the extension is defined by a second label base, a second label range, and label block offset.

16. A non-transitory storage medium storing processor executable instructions which, when executed by at least one processor, cause the at least one processor of a transport network device of a second type to perform a method for generating information about a newly added port belonging to a linked device of a first type and associated with a transparent LAN segment, the information to be disseminated to other devices of the second type, the method comprising:

a) obtaining, by the transport network device, a set of labels associated with the newly added port; and b) generating, by the transport network device, at least one message, the at least one message collectively including i) a first field for identifying the device of the second type;

ii) a second field for identifying the transparent LAN segment to which the newly added port belongs, iii) a third field for identifying the device of the first type in the context of the transparent LAN segment, and iv) a fourth field for identifying the set of labels.

17. The non-transitory storage medium of claim 16 wherein the set of labels is defined by a label base value and a label range value.

18. The non-transitory storage medium of claim 17 wherein the at least one message is associated with a group for targeting the distribution of the at least one message.

19. The non-transitory storage medium of claim 16 wherein the set of labels is contiguous.

20. The non-transitory storage medium of claim 16 wherein the method further includes c) sending, by the transport network device, the at least one message towards other devices of the second type belonging to the transport network.

21. The non-transitory storage medium of claim 16 wherein the at least one message further collectively includes:

vi) a fifth field for defining an extension to the set of labels, wherein the extension is defined by a second label base, a second label range, and label block offset.

22. A system comprising:

a) a transport network device of a second type for generating information, the transport network device including 1) an input obtaining a set of labels associated with the newly added port belonging to a linked device of a first type and associated with a transparent LAN segment, and 2) at least one processor generating at least one message, the at least one message collectively including A) a first field for identifying the device of the second type, B) a second field for identifying the transparent LAN segment to which the newly added port belongs, C) a third field for identifying the device of the first type in the context of the transparent LAN segment, and D) a fourth field for identifying the set of labels; and b) another transport network device of the second type including 1) an input for receiving the at least one message from the transport network device of the second type, and 2) at least one processor generating information used to communicate data to a device of the first type associated with the newly added port and linked with the transport network device of the second type, using contents included in the at least one message.

* * * * *